(12) United States Patent
Nygren et al.

(10) Patent No.: US 6,525,504 B1
(45) Date of Patent: Feb. 25, 2003

(54) METHOD AND DEVICE FOR CONTROLLING THE MAGNETIC FLUX IN A ROTATING HIGH VOLTAGE ELECTRIC ALTERNATING CURRENT MACHINE

(75) Inventors: Jan-Anders Nygren, Västerås (SE); Bertil Berggren, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/511,366

(22) Filed: Feb. 23, 2000

Related U.S. Application Data

(63) Continuation of application No. 08/980,214, filed on Nov. 28, 1997, now abandoned.

(51) Int. Cl.[7] .............................. H02P 9/10; H01B 7/00
(52) U.S. Cl. ............... 318/700; 310/180; 174/DIG. 15; 174/DIG. 16
(58) Field of Search .................... 318/700–799, 318/813; 310/180, 127, 184, 179, 259, 258, 260; 174/119 R, 106 SC, 105 SC, 113 A, DIG. 13–DIG. 33; 156/51

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |

(List continued on next page.)

FOREIGN PATENT DOCUMENTS

| | | |
|---|---|---|
| AT | 399790 | 7/1995 |
| CH | 391071 | 4/1965 |
| CH | 266037 | 10/1965 |

(List continued on next page.)

OTHER PUBLICATIONS

P. Marti and R. Schuler, "Manufacturing and Testing of Roebel Bars" (No Date).

(List continued on next page.)

Primary Examiner—Bentsu Ro
(74) Attorney, Agent, or Firm—Dykema Gossett, PLLC

(57) ABSTRACT

A rotating electric machine for direct connection to high-voltage networks, in which the magnetic circuit adapted for high voltage comprises a rotor, stator and main and auxiliary windings in operative relation. At least one of the windings is a conductor surrounded by a magnetically permeable, field confining insulation system.

48 Claims, 8 Drawing Sheets

U.S. PATENT DOCUMENTS

| | | |
|---|---|---|
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Kueper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A | 12/1981 | Schuler |
| 4,308,575 A | 12/1981 | Mase |
| 4,310,966 A | 1/1982 | Brietenbach |

| | | | | | |
|---|---|---|---|---|---|
| 4,314,168 A | 2/1982 | Breitenbach | 4,692,731 A | 9/1987 | Osinga |
| 4,317,001 A | 2/1982 | Silver et al. | 4,723,083 A | 2/1988 | Elton |
| 4,320,645 A | 3/1982 | Stanley | 4,723,104 A | 2/1988 | Rohatyn |
| 4,321,426 A | 3/1982 | Schaeffer | 4,724,345 A | 2/1988 | Elton et al. |
| 4,321,518 A | 3/1982 | Akamatsu | 4,732,412 A | 3/1988 | van der Linden et al. |
| 4,330,726 A | 5/1982 | Albright et al. | 4,737,704 A | 4/1988 | Kalinnikov et al. |
| 4,337,922 A | 7/1982 | Streiff et al. | 4,745,314 A | 5/1988 | Nakano |
| 4,341,989 A | 7/1982 | Sandberg et al. | 4,761,602 A | 8/1988 | Leibovich |
| 4,347,449 A | 8/1982 | Beau | 4,766,365 A | 8/1988 | Bolduc et al. |
| 4,347,454 A | 8/1982 | Gellert et al. | 4,771,168 A | 9/1988 | Gundersen et al. |
| 4,353,612 A | 10/1982 | Meyers | 4,785,138 A | 11/1988 | Brietenbach et al. |
| 4,357,542 A | 11/1982 | Kirschbaum | 4,795,933 A | 1/1989 | Sakai |
| 4,360,748 A | 11/1982 | Raschbichler et al. | 4,827,172 A | 5/1989 | Kobayashi |
| 4,361,723 A | 11/1982 | Hvizd, Jr. et al. | 4,845,308 A | 7/1989 | Womack, Jr. et al. |
| 4,365,178 A | 12/1982 | Lexz | 4,847,747 A | 7/1989 | Abbondanti |
| 4,367,425 A | 1/1983 | Mendelsohn et al. | 4,853,565 A | 8/1989 | Elton et al. |
| 4,367,890 A | 1/1983 | Spirk | 4,859,810 A | 8/1989 | Cloetens et al. |
| 4,368,418 A | 1/1983 | Demello et al. | 4,859,989 A | 8/1989 | McPherson |
| 4,369,389 A | 1/1983 | Lambrecht | 4,860,430 A | 8/1989 | Raschbichler et al. |
| 4,371,745 A | 2/1983 | Sakashita | 4,864,266 A | 9/1989 | Feather et al. |
| 4,384,944 A | 5/1983 | Silver et al. | 4,883,230 A | 11/1989 | Lindstrom |
| 4,387,316 A | 6/1983 | Katsekas | 4,890,040 A | 12/1989 | Gundersen |
| 4,401,920 A | 8/1983 | Taylor et al. | 4,894,284 A | 1/1990 | Yamanouchi et al. |
| 4,403,163 A | 9/1983 | Armerding et al. | 4,914,386 A | 4/1990 | Zocholl |
| 4,404,486 A | 9/1983 | Keim et al. | 4,918,347 A | 4/1990 | Takaba |
| 4,411,710 A | 10/1983 | Mochizuki et al. | 4,918,835 A | 4/1990 | Wcislo et al. |
| 4,421,284 A | 12/1983 | Pan | 4,924,342 A | 5/1990 | Lee |
| 4,425,521 A | 1/1984 | Rosenberry, Jr. et al. | 4,926,079 A | 5/1990 | Niemela et al. |
| 4,426,771 A | 1/1984 | Wang et al. | 4,942,326 A | 7/1990 | Butler, III et al. |
| 4,429,244 A | 1/1984 | Nikiten et al. | 4,949,001 A | 8/1990 | Campbell |
| 4,431,960 A | 2/1984 | Zucker | 4,982,147 A | 1/1991 | Lauw |
| 4,432,029 A | 2/1984 | Lundqvist | 4,994,952 A | 2/1991 | Silva et al. |
| 4,437,464 A | 3/1984 | Crow | 4,997,995 A * | 3/1991 | Simmons et al. |
| 4,443,725 A | 4/1984 | Derderian et al. | 5,012,125 A | 4/1991 | Conway |
| 4,470,884 A | 9/1984 | Carr | 5,030,813 A | 7/1991 | Stanisz |
| 4,473,765 A | 9/1984 | Butman, Jr. et al. | 5,036,165 A | 7/1991 | Elton et al. |
| 4,475,075 A | 10/1984 | Munn | 5,036,238 A | 7/1991 | Tajima |
| 4,477,690 A | 10/1984 | Nikitin et al. | 5,066,881 A | 11/1991 | Elton et al. |
| 4,481,438 A | 11/1984 | Keim | 5,067,046 A | 11/1991 | Elton et al. |
| 4,484,106 A | 11/1984 | Taylor et al. | 5,083,360 A | 1/1992 | Valencic et al. |
| 4,488,079 A | 12/1984 | Dailey et al. | 5,086,246 A | 2/1992 | Dymond et al. |
| 4,490,651 A | 12/1984 | Taylor et al. | 5,091,609 A | 2/1992 | Swada et al. |
| 4,503,284 A | 3/1985 | Minncik et al. | 5,094,703 A | 3/1992 | Takaoka et al. |
| 4,508,251 A | 4/1985 | Harada et al. | 5,095,175 A | 3/1992 | Yoshida et al. |
| 4,510,077 A | 4/1985 | Elton | 5,097,241 A | 3/1992 | Smith et al. |
| 4,517,471 A | 5/1985 | Sachs | 5,097,591 A | 3/1992 | Wcislo et al. |
| 4,520,287 A | 5/1985 | Wang et al. | 5,111,095 A | 5/1992 | Hendershot |
| 4,523,249 A | 6/1985 | Arimoto | 5,124,607 A | 6/1992 | Rieber et al. |
| 4,538,131 A | 8/1985 | Baier et al. | 5,136,459 A | 8/1992 | Fararooy |
| 4,546,210 A | 10/1985 | Akiba et al. | 5,140,290 A | 8/1992 | Dersch |
| 4,551,780 A | 11/1985 | Canay | 5,153,460 A | 10/1992 | Bovino et al. |
| 4,557,038 A | 12/1985 | Wcislo et al. | 5,168,662 A | 12/1992 | Nakamura et al. |
| 4,560,896 A | 12/1985 | Vogt et al. | 5,171,941 A | 12/1992 | Shimizu et al. |
| 4,565,929 A | 1/1986 | Baskin et al. | 5,182,537 A | 1/1993 | Thuis |
| 4,571,453 A | 2/1986 | Takaoka et al. | 5,187,428 A | 2/1993 | Hutchison et al. |
| 4,588,916 A | 5/1986 | Lis | 5,231,249 A | 7/1993 | Kimura et al. |
| 4,590,416 A | 5/1986 | Porche et al. | 5,235,488 A | 8/1993 | Koch |
| 4,594,630 A | 6/1986 | Rabinowitz et al. | 5,246,783 A | 9/1993 | Spenadel et al. |
| 4,607,183 A | 8/1986 | Rieber et al. | 5,264,778 A | 11/1993 | Kimmel et al. |
| 4,615,109 A | 10/1986 | Wcislo et al. | 5,287,262 A | 2/1994 | Klein |
| 4,615,778 A | 10/1986 | Elton | 5,304,883 A | 4/1994 | Denk |
| 4,618,795 A | 10/1986 | Cooper et al. | 5,305,961 A | 4/1994 | Errard et al. |
| 4,619,040 A | 10/1986 | Wang et al. | 5,321,308 A | 6/1994 | Johncock |
| 4,622,116 A | 11/1986 | Elton et al. | 5,323,330 A | 6/1994 | Asplund et al. |
| 4,633,109 A | 12/1986 | Feigel | 5,325,008 A | 6/1994 | Grant |
| 4,650,924 A | 3/1987 | Kauffman et al. | 5,325,259 A | 6/1994 | Paulsson |
| 4,652,963 A | 3/1987 | Fahlen | 5,327,637 A | 7/1994 | Britenbach et al. |
| 4,656,316 A | 4/1987 | Meltsch | 5,341,281 A | 8/1994 | Skibinski |
| 4,656,379 A | 4/1987 | McCarty | 5,343,139 A | 8/1994 | Gyugi et al. |
| 4,677,328 A | 6/1987 | Kumakura | 5,355,046 A | 10/1994 | Weigelt |
| 4,687,882 A | 8/1987 | Stone et al. | 5,365,132 A | 11/1994 | Hann et al. |

| | | | | | | |
|---|---|---|---|---|---|---|
| 5,387,890 | A | 2/1995 | Estop et al. | DE | 2050674 | 5/1971 |
| 5,397,513 | A | 3/1995 | Steketee, Jr. | DE | 1638176 | 6/1971 |
| 5,399,941 | A | 3/1995 | Grothaus et al. | DE | 2155371 | 5/1973 |
| 5,400,005 | A | 3/1995 | Bobry | DE | 2400698 | 7/1975 |
| 5,408,169 | A | 4/1995 | Jeanneret | DE | 2520511 | 11/1976 |
| 5,449,861 | A | 9/1995 | Fujino et al. | DE | 2656389 | 6/1978 |
| 5,452,170 | A | 9/1995 | Ohde et al. | DE | 2721905 | 11/1978 |
| 5,468,916 | A | 11/1995 | Litenas et al. | DE | 2824951 | 12/1979 |
| 5,499,178 | A | 3/1996 | Mohan | DE | 2835386 | 2/1980 |
| 5,500,632 | A | 3/1996 | Halser, III | DE | 2839517 | 3/1980 |
| 5,510,942 | A | 4/1996 | Bock et al. | DE | 2854520 | 6/1980 |
| 5,530,307 | A | 6/1996 | Horst | DE | 3009102 | 9/1980 |
| 5,533,658 | A | 7/1996 | Benedict et al. | DE | 2913697 | 10/1980 |
| 5,534,754 | A | 7/1996 | Poumey | DE | 2920478 | 12/1980 |
| 5,545,853 | A | 8/1996 | Hildreth | DE | 3028777 | 3/1981 |
| 5,550,410 | A | 8/1996 | Titus | DE | 2939004 | 4/1981 |
| 5,583,387 | A | 12/1996 | Takeuchi et al. | DE | 3006382 | 8/1981 |
| 5,587,126 | A | 12/1996 | Steketee, Jr. | DE | 3008818 | 9/1981 |
| 5,598,137 | A | 1/1997 | Alber et al. | DE | 209313 | 4/1984 |
| 5,607,320 | A | 3/1997 | Wright | DE | 3305225 | 8/1984 |
| 5,612,510 | A | 3/1997 | Hildreth | DE | 3309051 | 9/1984 |
| 5,663,605 | A | 9/1997 | Evans et al. | DE | 3441311 | 5/1986 |
| 5,672,926 | A | 9/1997 | Brandes et al. | DE | 3543106 | 6/1987 |
| 5,689,223 | A | 11/1997 | Demarmels et al. | DE | 2917717 | 8/1987 |
| 5,807,447 | A | 9/1998 | Forrest | DE | 3612112 | 10/1987 |
| 5,834,699 | A | 11/1998 | Buck et al. | DE | 3726346 | 2/1989 |
| 5,896,021 | A * | 4/1999 | Kumar | DE | 3925337 | 2/1991 |
| 6,226,163 | B1 * | 5/2001 | Berhoff et al. | DE | 4023903 | 11/1991 |
| 2001/0019499 | A1 * | 9/2001 | Leijon et al. | DE | 4022476 | 1/1992 |
| | | | | DE | 4233558 | 3/1994 |
| | | | | DE | 4402184 | 8/1995 |

FOREIGN PATENT DOCUMENTS

| | | | | | |
|---|---|---|---|---|---|
| CH | 534448 | 2/1973 | DE | 4409794 | 8/1995 |
| CH | 539328 | 7/1973 | DE | 4412761 | 10/1995 |
| CH | 646403 | 2/1979 | DE | 4420322 | 12/1995 |
| CH | 657482 | 8/1986 | DE | 19620906 | 1/1996 |
| CH | 1189322 | 10/1986 | DE | 4438186 | 5/1996 |
| DD | 137164 | 8/1979 | DE | 19020222 | 3/1997 |
| DD | 138840 | 11/1979 | DE | 19547229 | 6/1997 |
| DE | 40414 | 8/1887 | DE | 468827 | 7/1997 |
| DE | 277012 | 7/1914 | DE | 134022 | 12/2001 |
| DE | 336418 | 6/1920 | EP | 049104 | 4/1982 |
| DE | 372390 | 3/1923 | EP | 0493704 | 4/1982 |
| DE | 386561 | 12/1923 | EP | 0056580 A1 | 7/1982 |
| DE | 387973 | 1/1924 | EP | 078908 | 5/1983 |
| DE | 406371 | 11/1924 | EP | 0120154 | 10/1984 |
| DE | 425551 | 2/1926 | EP | 0130124 | 1/1985 |
| DE | 426793 | 3/1926 | EP | 0148213 | 5/1985 |
| DE | 432169 | 7/1926 | EP | 0155405 | 9/1985 |
| DE | 433749 | 9/1926 | EP | 0102513 | 1/1986 |
| DE | 435608 | 10/1926 | EP | 0174783 | 3/1986 |
| DE | 435609 | 10/1926 | EP | 0185788 | 7/1986 |
| DE | 441717 | 3/1927 | EP | 0277358 | 8/1986 |
| DE | 443011 | 4/1927 | EP | 0234521 | 9/1987 |
| DE | 460124 | 5/1928 | EP | 0244069 | 11/1987 |
| DE | 482506 | 9/1929 | EP | 0246377 | 11/1987 |
| DE | 501181 | 7/1930 | EP | 0265868 | 5/1988 |
| DE | 523047 | 4/1931 | EP | 0274691 | 7/1988 |
| DE | 568508 | 1/1933 | EP | 0280759 | 9/1988 |
| DE | 572030 | 3/1933 | EP | 0282876 | 9/1988 |
| DE | 584639 | 9/1933 | EP | 0309096 | 3/1989 |
| DE | 586121 | 10/1933 | EP | 0314860 | 5/1989 |
| DE | 604972 | 11/1934 | EP | 0316911 | 5/1989 |
| DE | 629301 | 4/1936 | EP | 0317248 | 5/1989 |
| DE | 673545 | 3/1939 | EP | 0335430 | 10/1989 |
| DE | 719009 | 3/1942 | EP | 0342554 | 11/1989 |
| DE | 846583 | 8/1952 | EP | 0221404 | 5/1990 |
| DE | 875227 | 4/1953 | EP | 0375101 | 6/1990 |
| DE | 565063 | 2/1957 | EP | 0406437 | 1/1991 |
| DE | 975999 | 1/1963 | EP | 0439410 | 7/1991 |
| DE | 1465719 | 5/1969 | EP | 0440865 | 8/1991 |
| DE | 1807391 | 5/1970 | EP | 0469155 A1 | 2/1992 |

| | | | | | |
|---|---|---|---|---|---|
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965741 | 8/1964 | JP | 7264789 | 3/1994 |
| GB | 992249 | 5/1965 | JP | 8167332 | 12/1994 |
| GB | 1024583 | 3/1966 | JP | 7161270 | 6/1995 |
| GB | 1053337 | 12/1966 | JP | 8264039 | 11/1995 |
| GB | 1059123 | 2/1967 | JP | 9200989 | 1/1996 |
| GB | 1103098 | 2/1968 | JP | 8036952 | 2/1996 |
| GB | 1103099 | 2/1968 | JP | 8167360 | 6/1996 |
| GB | 1117401 | 6/1968 | LU | 67199 | 3/1972 |
| GB | 1135242 | 12/1968 | SE | 90308 | 9/1937 |
| GB | 1147049 | 4/1969 | SE | 305899 | 11/1968 |
| GB | 1157885 | 7/1969 | SE | 255156 | 2/1969 |

| | | | | | | |
|---|---|---|---|---|---|---|
| SE | 341428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO 98/20598 | 5/1998 |
| SU | 792302 | 1/1971 | | WO | WO9820600 | 5/1998 |
| SU | 425268 | 9/1974 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1511810 | 5/1987 | | WO | WO9827635 | 6/1998 |
| WO | WO 97/45908 | 12/1977 | | WO | WO9827636 | 6/1998 |
| WO | WO8202617 | 8/1982 | | WO | WO9829927 | 7/1998 |
| WO | WO8502302 | 5/1985 | | WO | WO9829928 | 7/1998 |
| WO | WO9524049 | 9/1985 | | WO | WO9829929 | 7/1998 |
| WO | WO9011389 | 10/1990 | | WO | WO9829930 | 7/1998 |
| WO | WO9012409 | 10/1990 | | WO | WO9829931 | 7/1998 |
| WO | PCT/DE 90/00279 | 11/1990 | | WO | WO9829932 | 7/1998 |
| WO | WO9101585 | 2/1991 | | WO | WO9833731 | 8/1998 |
| WO | WO9107807 | 3/1991 | | WO | WO9833736 | 8/1998 |
| WO | PCT SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO 98/34239 | 8/1998 |
| WO | WO8115862 | 10/1991 | | WO | WO9834240 | 8/1998 |
| WO | WO 91/15755 | 10/1991 | | WO | WO9834241 | 8/1998 |
| WO | WO9201328 | 1/1992 | | WO | WO9834242 | 8/1998 |
| WO | WO9203870 | 3/1992 | | WO | WO9834243 | 8/1998 |
| WO | WO9321681 | 10/1993 | | WO | WO9834244 | 8/1998 |
| WO | WO9101059 | 1/1994 | | WO | WO9834245 | 8/1998 |
| WO | WO9406194 | 3/1994 | | WO | WO9834246 | 8/1998 |
| WO | WO9518058 | 7/1995 | | WO | WO9834247 | 8/1998 |
| WO | WO9522153 | 8/1995 | | WO | WO9834248 | 8/1998 |
| WO | WO9622606 | 7/1996 | | WO | WO9834249 | 8/1998 |
| WO | WO9622607 | 7/1996 | | WO | WO9834250 | 8/1998 |
| WO | PCT/CN 96/00010 | 10/1996 | | WO | WO9834309 | 8/1998 |
| WO | WO9630144 | 10/1996 | | WO | WO9834312 | 8/1998 |
| WO | WO9710640 | 3/1997 | | WO | WO9834315 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |
| WO | WO9745930 | 12/1997 | | WO | WO9917428 | 4/1999 |
| WO | WO9745931 | 12/1997 | | WO | WO9917429 | 4/1999 |
| WO | WO9745932 | 12/1997 | | WO | WO9917432 | 4/1999 |
| WO | WO9745933 | 12/1997 | | WO | WO9917433 | 4/1999 |
| WO | WO9745934 | 12/1997 | | WO | WO9919963 | 4/1999 |
| WO | WO9745935 | 12/1997 | | WO | WO9919969 | 4/1999 |
| WO | WO9745936 | 12/1997 | | WO | WO9919970 | 4/1999 |
| WO | WO9745937 | 12/1997 | | WO | PCT/SE 98/02148 | 6/1999 |
| WO | WO9745938 | 12/1997 | | WO | WO9927546 | 6/1999 |
| WO | WO9745939 | 12/1997 | | WO | WO9928919 | 6/1999 |
| WO | WO9747067 | 12/1997 | | WO | WO9928921 | 6/1999 |

| | | |
|---|---|---|
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

M. Ichihara and F. Fukasawa, "An EHV Bulk Power Transmission Line Made with Low Loss XLPE Cable," Aug. 1992, *Hitachi Cable Review*, No. 11, pp. 3–6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw–Hill, Inc. (No Date).

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems*, vol. PAS–102, No. 8, Aug. 1983, pp. 2694–2701.

R. F. Schiferl and C. M. Ong, "Six Phase Synchronous Machine with AC and DC Stator Connections, Part I: Equivalent Circuit Representation and Steady–State Analysis", *IEEE Transactions on Power Apparatus and Systems*, vol. PAS–102, No. 8, Aug. 1983, pp. 2685–2693.

T. Petersson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines*, Chapter 9, McGraw Hill, 1987, pp. 9–1 — 9–25.

Shipboard Electrical Insulation; G. L. Moses, 1951, pp. 2&3.

ABB Elkrafthandbok; ABB AB; 1988 ; pp. 274–276.

Elkraft teknisk Handbok, 2 Elmaskiner; A. Alfredsson et al; 1988, pp. 121–123.

High Voltage Cables in a New Class of Generators Powerformer; M. Leijon et al; Jun. 14, 1999; pp. 1–8.

Ohne Tranformator direkt ins Netz; Owman et al, ABB, AB; Feb. 8, 1999; pp. 48–51.

Submersible Motors and Wet–Rotor Motors for Centrifugal Pumps Submerged in the Fluid Handled; K.. Bienick, KSB; Feb. 25, 1988; pp. 9–17.

High Voltage Generators; G. Beschastnov et al; 1977; vol. 48. No. 6 pp. 1–7.

Eine neue Type von Unterwassermotoren; Electrotechnik und Maschinenbam, 49; 8/1931; pp. 2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub.86, vol. 8, pp. 25–31.

Hydroalternators of 110 to 220 kV Elektrotechn. Obz., vol. 64, No. 3, pp. 132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp. 35–40, 1988.

Zur Entwicklung der Tauchpumpenmotoren; A. Schanz; KSB, pp. 19–24 No Date.

Direct Generation of alternating current at high voltages; R. Parsons; IEEE Journal, vol. 67 #393, Jan. 15, 1929; pp. 1065–1080.

Stopfbachslose Umwalzpumpen– ein wichtiges Element in modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Anwendung moderner Tauchpumpen; A. Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 11/1988, pp. 5376–5378.

An EHV bulk Power transmission line Made with Low Loss XLPE Cable;Ichihara et al; 8/92; pp. 3–6.

Underground Transmission Systems Reference Book; 1992;pp. 16–19; pp. 36–45; pp. 67–81.

Power System Stability and Control; P. Kundur, 1994; pp. 23–25;p. 767.

Six phase Synchronous Machine with AC and DC Stator Connections, Part II:Harmonic Studies and a proposed Uninterruptible Power Supply Scheme; R. Schiferl et al.;8/1983 pp. 2694–2701.

Six phase Synchronous Machine with AC and DC Stator Connections, Part 1: Equivalent circuit representation and Steady–State Analysis; R. Schiferl et al; 8/1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf grosser Turbogeneratoren bis 2GVA, 6OkV; G. Aicholzer; 9/1974, pp. 249–255.

Advanced Turbine–generators– an assessment; A. Appleton, et al; International Conf. Proceedings, Lg HV Elec. Sys. Paris, FR, Aug.–Sep./1976, vol. I, Section 11–02, p. 1–9.

Fully slotless turbogenerators; E. Spooner; Proc., IEEE vol. 120 #12, 12/1973.

Toroidal winding geometry for high voltage superconducting alternators; J. Kirtley et al; MIT—Elec. Power Sys. Engrg. Lab for IEEE PES;2/1974.

High–Voltage Stator Winding Development; D. Albright et al; Proj. Report EL339, Project 1716, Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; 6/1994, pp. 330–334.

Development of extruded polymer insulated superconducting cable; 1/1992.

Transformer core losses; B. Richardson; Proc. IEEE 5/1986, pp. 365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference 6/1995, pp. 64–70.

Analysis of faulted Power Systems; P Anderson, Iowa State University Press / Ames, Iowa, 1973, pp. 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* ,1970, pp. 6–8.

J&P Transformer Book 11$^{th}$ Edition;A. C. Franklin et al; owned by Butterworth—Heinemann Ltd, Oxford Printed by Hartnolls Ltd in Great Britain 1983, pp. 29–67.

Transformerboard; H.P. Moser et al; 1979, pp. 1–19.

The Skagerrak transmission—the world's longest HVDC submarine cable link; L. Haglof et al of ASEA; ASEA Journal vol. 53, No. 1–2, 1980, pp. 3–12.

Direct Connection of Generators to HVDC Converters: Main Characteristics and Comparative Advantages; J.Arrillaga et al; *Electra* No. 149, 08/ 1993, pp. 19–37.

Our flexible friend article; M. Judge; *New Scientist*, May 10, 1997, pp. 44–48.

In–Service Performance of HVDC Converter transformers and oil–cooled smoothing reactors; G.L. Desilets et al; *Electra* No. 155, 08/1994, pp. 7–29.

Transformateurs a courant continu haute tension–examen des specifications; A. Lindroth et al; *Electra* No. 141, 04/1992, pp. 34–39.

Development of a Termination for the 77 kV–Class High Tc Superconducting Power Cable; T. Shimonosono et al; IEEE Power Delivery, vol. 12, No. 1, 01/1997, pp. 33–38.

Verification of Limiter Performance in Modern Excitation Control Systems; G. K. Girgis et al; IEEE Energy Conservation, vol. 10, No. 3, 09/1995, pp. 538–542.

A High Initial response Brushless Excitation System; T. L. Dillman et al; IEEE Power Generation Winter Meeting Proceedings, Jan. 31, 1971, pp. 2089–2094.

Design, manufacturing and cold test of a superconducting coil and its cryostat for SMES applications; A Bautista et al; IEEE Applied Superconductivity, vol. 7, No. 2, 06/1997, pp. 853–856.

Quench Protection and Stagnant Normal Zones in a Large Cryostable SMES; Y. Lvovsky et al; IEEE Applied Superconductivity, vol. 7, No. 2, 06/1997, pp. 857–860.

Design and Construction of the 4 Tesla Background Coil for the Navy SMES Cable Test Apparatus; D.W.Scherbarth et al; IEEE Appliel Superconductivity, vol. 7, No. 2, 06/1997, pp. 840–843.

High Speed Synchronous Motors Adjustable Speed Drives; ASEA Generation Pamphlet OG 135–101 E, 01/1985, pp. 1–4.

Billig burk motar overtonen; A. Felldin; *ERA* (Teknik) 08/1994, pp. 26–28.

400–kV XLPE cable system passes CIGRE test; ABB Article; ABB Review 09/1995, pp 38.

Freqsyn—a new drive system for high power applications;J–A. Bergman et al; ASEA Journal 59, 04/1986, pp. 16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review 08/1969, pp. 380–385.

Relocatable static var compensators help control unbundled power flows; R. C. Knight et al; *Transmission & Distribution*, 12/1996, pp. 49–54.

Investigation and Use of Asynchronized Machines in Power Systems*; N.I.Blotskii et al; *Elektrichestvo*, No. 12, 1–6, 1985, pp. 90–99.

Variable–speed switched reluctance motors; P.J. Lawrenson et al; IEE proc, vol. 127, Pt.B, No. 4, 07/1980, pp. 253–265.

Das Einphasenwechselstromsystem hoherer Frequenz; J.G. Heft; Elektrische Bahnen eb; 12/1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp. 3–6—3–12.

Die Wechselstromtechnik; A. Cour' Springer Verlag, Germany; 1936, pp. 586–598.

Insulation systems for superconducting transmission cables; O.Toennesen; Nordic Insulation Symposium, Bergen, 1996, pp. 425–432.

MPTC: An economical alternative to universal power flow controllers;N. Mohan; EPE 1997, Trondheim, pp. 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems– new concepts and applications; E. Wirth et al; ABB Review 04/1977, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. 1, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19,No.3, Part 2, 05/1983, pp. 1048–1050.

Application of high temperature superconductivy to electric motor design; J.S. Edmonds et al; IEEE Transactions on Energy Conversion 06/1992, No. 2 , pp. 322–329.

Power Electronics and Variable Frequency Drives; B. Bimal; IEEE industrial Electronics—Technology and Applications, 1996, pp.356.

Properties of High Plymer Cement Mortar; M. Tamai et al; *Science & Technology in Japan*, No. 63 ; 1977, pp. 6–14.

Weatherability of Polymer–Modified Mortars after Ten–Year Outdoor Exposure in Koriyama and Sapporo; Y. Ohama et al; *Science & Technology in Japan No. 63*; 1977, pp. 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensity laser–triggering of rail–gaps with magnesium–aerosol switching–gases; W. Frey; 11 th International Pulse Power Conference, 1997, Baltimore, USA Digest of Technical Papers, p. 322–327.

* cited by examiner

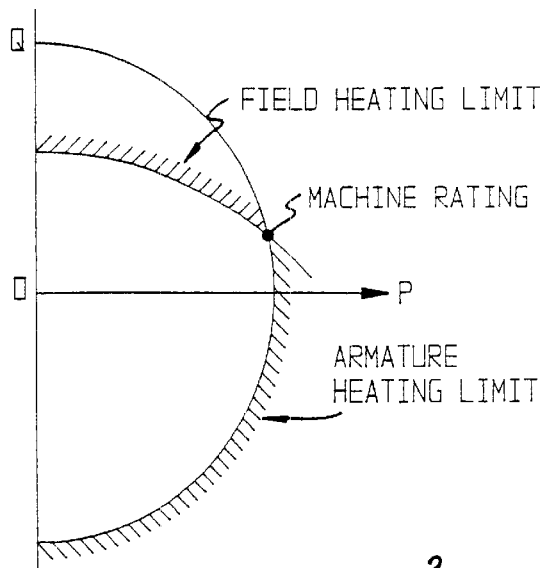
FIG. 1
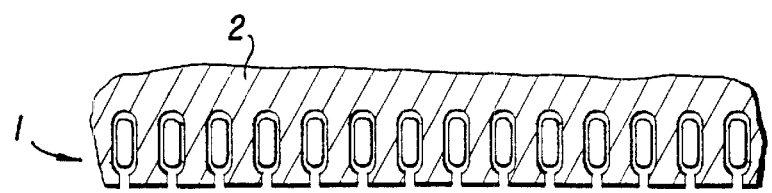
FIG. 2
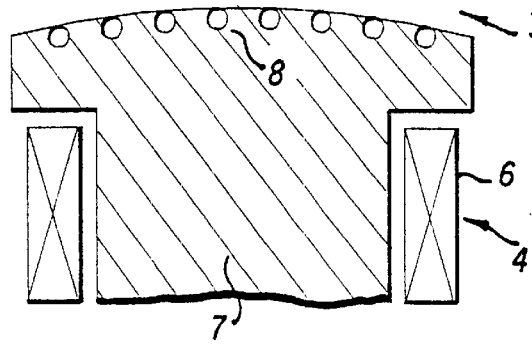
FIG. 2A
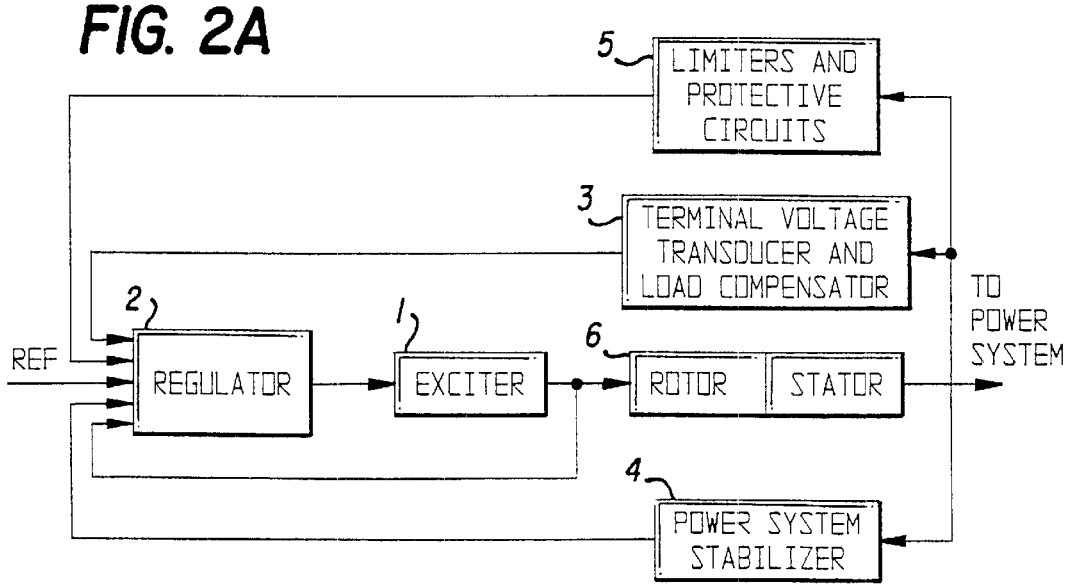

METHOD AND DEVICE FOR CONTROLLING THE MAGNETIC FLUX IN A ROTATING HIGH VOLTAGE ELECTRIC ALTERNATING CURRENT MACHINE

CROSS-REFERENCE TO RELATED APPLICATION

This is a continuation of application Ser. No. 08/980,214, filed Nov. 28, 1997, now abandoned. This application is related to copending U.S. application Ser. No. 08/980,213, filed on even date herewith, and Ser. No. 08/973,019, filed on even date herewith, the teachings of which are incorporated herein by referece.

BACKGROUND OF THE INVENTION

The present invention relates to a method and device for controlling the magnetic flux in a rotating high voltage electric alternating current machine with at least one auxiliary winding in the stator.

The invention relates mainly to an electric high voltage rotating electric alternating current machine intended to be directly connected to a distribution or transmission network or power networks, operating at high, extra high and ultra high voltages, comprising a magnetic circuit with a magnetic core, a main winding and at least one auxiliary winding. Such electric machines are typically synchronous machines which mainly are used as generators for connection to distribution or transmission networks, generally referred to below as power networks. Such synchronous machines are also used as motors and synchronous compensators. The technical field also comprises double-fed machines, asynchronous machines, asynchronous converter cascades, outer pole machine and synchronous flux machines.

When building synchronous machines with cylindrical rotors and particularly synchronous machines with low power factor and long rotors the cooling of the rotor can be a problem.

A machine is usually designed in order to realize an economic yield from the electromagnetic circuit. This normally leads to generated harmonic electromotive forces in addition to the generated fundamental electromotive force. Third harmonic electromotive forces are generated mainly due to saturation effects in the machine. In the generated harmonics third harmonic usually is the largest.

When connecting a machine to a power network a delta/wye step-up transformer usually is used. This delta/wye connected step-up transformer effectively blocks third harmonics and multiples of third harmonics.

When a machine is directly connected to a directly grounded power network without a delta/wye connected step-up transformer third harmonics and multiples of third harmonics may start to flow in the current machine and in the power network. Such third harmonics may damage the machine and equipment in the power network. Other problems also may occur. However, the foregoing is an example of one significant problem.

It is well known that it is possible to manufacture such a machine with one or more extra windings in the stator. It is described for instance in SIX PHASE SYNCHRONOUS MACHINE WITH AC AND DC STATOR CONNECTIONS, *IEEE Transactions on Power Apparatus and Systems*, Vol. PAS-102, No. 8 August 1983.

When manufacturing a stator with conventional insulation techniques, it is difficult to manufacture such a machine with a rated voltage higher than approximately 10–25 kV. If the stator is manufactured with two separate windings the rated voltage of each winding is usually the same. This is due to the conventional insulation technique. Therefore manufacture of a machine with completely different voltage levels in the windings has not been of interest.

Furthermore, connecting electric equipment to such auxiliary winding is not particularly complicated, this is because the voltage seldom is higher than approximately 10–25 kV as noted.

When using directly connected high voltage machines, for instance above 36 kV, it is desirable to have windings designed for two or more voltage levels. For example, separation of voltage levels allows the main winding of the machine to be connected to a high voltage system and to use low voltage equipment with the auxiliary winding. With such an arrangement the equipment connected to the auxiliary winding may be simpler than if this equipment was to be connected to a high voltage winding (i.e., High voltage equipment is often more complicated than low voltage equipment).

The effectiveness of reactive power control on a power network may be of the utmost importance not only under normal conditions, but also during major system disturbances. It is often advantageous to operate the transmission parts of a power network with a fairly flat voltage profile, in order to avoid unnecessary reactive power flows; and reactive power capacity reserves available for use in connection with major disturbances and under generator, transformer or line outage conditions. The aim of the steady state voltage control is to keep the transmission bus voltages within fairly narrow limits, while the load transferred varies.

The basic voltage control of a power network is provided by the large synchronous generators, each having its own excitation system with an automatic voltage regulator. The generators are used for voltage control at the terminals to which they are connected. Reactive power is generated or absorbed, depending on the load conditions.

Transfer of reactive power from the generators to electrically remote points of the power network or vice versa is usually avoided under normal operating conditions. Generators are, however, very important as reserve sources of reactive power which may be needed also rather far from the generators. For example, if there is a sudden loss of a main generator or a major line section, short-time reactive overload capability of generators may be a valuable resource on such occasions.

Reactive power is present in all electric power networks that transfer alternating current. Many loads consume not only active power but also reactive power. Transmission and distribution of electric power itself results in reactive losses due to series inductance in transformers, overhead lines and cables. Overhead lines and cables also produce reactive power as a result of capacitive connections between phases and between phases and ground potential.

Proper operation of an alternating current system requires agreement between active power production and consumption in order to obtain nominal frequency. An equally strong relationship exists between reactive power balance and voltage in the electric power network. If reactive power consumption and production are not balanced in a suitable manner, the result may be unacceptable voltage levels in parts of the electric power network. An excess of reactive power in one area leads to high voltages, whereas a deficiency leads to low voltages which in worst case can lead to a power network collapse.

In a power network the synchronous machines are one of the most important producers of controllable reactive power. Production of reactive power by the synchronous generators is therefore vital for power network voltage control. When the loads in the power network are changing and the demands of active and reactive power changes the control equipment of the synchronous generators will change production of the active and reactive power from the synchronous generators.

When the power network requires more reactive power, e.g., when the bus voltage is decreasing, the control equipment of the synchronous generators stall to increase the production of reactive power and vice versa. At some point, see FIG. 1, the synchronous generator is not able to produce more reactive power, typically because the field winding reaches it's maximum allowable temperature. If the reactive power demand of the power network has not been fulfilled, the voltage in the power network may start to fall which can result in a power network collapse.

Generators supply active power, provide the primary voltage control of the power network; and bring about, or at least contribute to, the desired reactive power balance in the areas adjacent to the generating stations.

A generator absorbs reactive power when underexcited, and produces reactive power when overexcited. The reactive power output is continuously controllable through varying the excitation current.

The allowable reactive power absorption or production is dependent on the active power output as illustrated by the capability diagram of FIG. 1. For short term operation the thermal limits can usually be overridden.

Synchronous generators are usually rated in terms of the maximum apparent power load at a specific voltage and power factor which they can carry continuously without overheating. The active power output of the generator is usually limited to a value within the apparent power rating by the capability of its prime mover. Since the per unit apparent power is given by:

$$\text{Apparent Power} = \sqrt{P^{2} + Q^{2}}$$

where P represents the per unit active power and Q represents the per unit reactive power, hence a constant apparent power corresponds to a circle centered on the origin on a plot of reactive power versus active power shown in FIG. 1.

The power factor at which a synchronous machine operates, and hence its armature current, can be controlled by adjusting its field excitation. The production of reactive power is consequently dependent upon the field current and the regulation of the prime mover.

The ability to produce reactive power is limited by the field current that have a maximum value as determined by the so-called field heating limit, as shown in FIG. 11. This limit can be overridden for a short term, e.g., a few seconds. The complete capability diagram for a synchronous generator typically includes more limits than is shown.

There are several ways to enhance reactive power capability in a synchronous machine. One way is to enhance the cooling of the rotor, e.g., by introducing water cooling. This is, however, a complicated and expensive method.

A turbo generator is often placed near the load. It is typically designed to be able to produce more reactive power than, for instance, a hydro generator which is normally located far away from the load. A consequence of greater reactive capacity is an increase in the rotor heat losses. Problems associated with cooling a rotor are related to the length and the peripheral velocity of the rotor. Consequently, for high speed machines with long rotors, particularly turbo machines, it is desirable to reduce the need for rotor cooling.

Voltage stability is the ability of a power network to maintain steady acceptable voltages at all busses in the system under normal operating conditions and after being subjected to a disturbance. A power network is said to have entered a state of voltage instability when a disturbance causes a progressive and uncontrollable decline in voltage. Inadequate reactive power support may lead to voltage instability or voltage collapse, which can result in major system failures. One way to avoid a voltage collapse is to inject extra reactive power at appropriate places in the power network.

If the generator can support the power network with overload capacity for reactive power for a short period of time, it is possible to take actions to avoid voltage collapse in such period. If these actions are taken manually, the generator may be required to provide the power network with overload capacity of reactive power for approximate 10–15 minutes. In such period the operator can make decisions and take steps to prevent a voltage collapse. If these decisions are made automatically the time requirement reduces to a few minutes.

Significant improvements in transient stability can be achieved through rapid temporally increase of generator excitation. The increase of generator field voltage during a transient disturbance has the effect of increasing the internal voltage of the machine; this in turn increases the synchronizing power.

During a transient disturbance following a power network fault and clearing of the fault by isolating the faulted element, the generator terminal voltage is low. The automatic voltage regulator responds to this condition by increasing the generator field voltage. This has a beneficial effect on the transient stability. The effectiveness of this type of control depends on the ability of the excitation system to quickly increase the field voltage to the highest possible value. A high-initial response excitation system and high-ceiling voltages are most effective in this regard. Ceiling voltages are, however, limited by generator rotor insulation considerations. For thermal units, the ceiling voltages are limited to about 2.5 to 3.0 times the rated-load voltage.

With stationary exciter systems, the DC output is fed to the field winding of the main generator through slip rings. This is perhaps the excitation system with the highest initial response performance. The time-constant for the excitation is typically 0.4 times the machine time constant e.g., 2–6 seconds. One drawback is that the slip ring needs periodic service.

With rotating exciter systems, the need for slip rings and brushes is eliminated, and the DC output is directly fed to the main generator field. Such excitation systems may have an initial response slower than stationary rectifiers. However, high initial response performance can be achieved by special design of the AC exciter and high voltage forcing of the exciter field winding. An example of such system is described in T. L. Dillman, J. W. Skooglund, F. W. Keay, W. H. South, and C. Raczkowski, A HIGH INITIAL RESPONSE BRUSHLESS EXCITATION SYSTEM, *IEEE Trans.*, Vol. PAS-90, pp. 2089–2094, September/October 1971.

In a power network, sudden load changes result in power oscillations in the power network. A generator and its excitation system can reduce these oscillations. This part of excitation control is referred to as Power System Stabilizer. Modern excitation systems are capable of providing practically instantaneous response with high ceiling voltages. The combination of high field-forcing capability and the use of auxiliary stabilizing signals contributes to substantial enhancement of the overall system dynamic performance.

Small signal stability, as defined in P. Kundur, POWER SYSTEM STABILITY AND CONTROL, McGraw-Hill 1993, is the ability of the power system to maintain synchronism when subjected to small disturbances. In today's practical power systems, the small signal stability problem is usually one of insufficient damping of system oscillations.

The use of power system stabilizers to control generator excitation systems is the most cost-effective method to enhancing the small signal stability of power systems. The function of a power system stabilizer is to add damping to the generator oscillations. This is achieved by modulating the generator excitation as to develop a component of electrical torque in phase with rotor speed deviations.

There are a number of components in the power network which can be used to damp power oscillations. It is for instance possible to equip SVC and HVDC plants with supplementary control for this purpose. However, one of the most common ways to add damping to generator rotor oscillations is by controlling its excitation using auxiliary stabilizing signal(s). This control function is usually called a PSS (Power System Stabilizer). FIG. 19, from the book "Power System Stability and Control" by Prabha Kundur page 767, illustrates how a block diagram of a generator with voltage regulator and PSS may look like. To provide damping, the PSS must produce a component of electric torque in phase with the rotor speed deviations. A logical signal to use for controlling generator excitation is the rotor speed deviation. If the exciter transfer function Gex(S) and the generator transfer function between field voltage (o E,d) and electric torque (o Tc) are pure gains, a direct feedback of deviation in rotor speed (o Er) results in a damping torque component. However, in practice both the generator and the exciter (depending on its type) exhibit frequency dependent gain and phase characteristics. In the ideal case, with the phase characteristic of the PSS (Gpss(S)) being an exact inverse of the exciter and generator phase characteristics to be compensated, the PSS results in a pure damping torque at all oscillating frequencies. It is however difficult to design the PSS such that pure damping is obtained for all frequencies, partly because the phase characteristics changes with system conditions. Normally, the frequency range of interest is 0.1 to 2.0 Hz, and the phase-lead network should provide compensation over this range.

FIG. 2 shows a sector of a conventional salient pole machine 1 having a stator 2 with an armature winding 3 and rotor 4. The rotor 4 has a field winding 6 designed as a concentrated coil wound on a pole 7. In a turbo machine the field winding is distributed in slots in a solid steel rotor. A damper winding 8 is made up of bars embedded in slots in the pole faces, as shown, and connected to end rings (not shown) and are intended to damp out speed oscillations. In case actual damper windings are not supplied, short-circuit paths may be formed in the pole faces which are then made of solid iron.

Damper windings 8 are inactive in steady state balanced operation. The air gap flux has a constant amplitude at rest with respect to the poles, and no currents are induced in the damper. During a transient, however, the amplitude of the flux 25 varies. The flux wave moves with respect to the poles, and currents, acting to stabilize the performance of the machine, are induced in the dampers. Transients caused by load changes or other disturbances such as short circuits or switching phenomena are more rapidly damped out when damper windings are fitted in the machine.

In applications such as generators driven by combustion machines or motors for compressors, the torque pulsates. The machine thus has a tendency to hunt, and the currents in the dampers act to suppress hunting. The dampers may also provide the necessary starting torque for synchronous motors and condensers.

Unbalanced operation of the machine may induce harmonic voltage components in the windings of the machine. For instance, a single-phase ground fault will give harmonics and dangerous over-voltages may be produced because of resonance between the line capacitance and the line and machine inductances. Harmonic voltages of this kind are suppressed by dampers.

When a rotor is equipped with a damping winding a drawback is that the rotor is more complicated compared with a rotor without a damping winding, see FIG. 2. This also makes the rotor more expensive. Another disadvantage is that the damping winding cannot suppress above mentioned harmonics and dangerous over voltages completely.

In the design of three-phase alternating current machines, it is desirable to achieve symmetrical and sinusoidal operation. In order to obtain an economic yield from the electromagnetic circuit, a third harmonic electromotive force is generated as a harmonic to the fundamental electromotive force. Under certain conditions this third harmonic electromotive force cause third harmonic currents to flow in the current machine and in the power network.

It is well known that chording of the stator winding may be chosen in order to eliminate one or more of the harmonics. It is also well known regarding current machines with salient poles that the shape of the electromotive force of these machines may be influenced and improved by choosing the design of the rotor poles and, especially, the shape of the pole shoes in an appropriate way.

A total elimination of the third harmonic of the voltage, for example, by choosing an appropriate size for the winding step, however, results in a considerable reduction, approximately 14%, of the fundamental frequency voltage available for torque generation. This thus means only 86% utilization of the possible rated power. In order to avoid this reduction, the winding step is used mainly for suppression of the fifth harmonic whereby the reduction becomes only a few percent. Adaptation of the shape of the pole shoe is often used for a cost-effective reduction of the seventh harmonic voltage. Elimination or reduction of the harmful effects of the third harmonic voltage/current must thus be performed by other methods.

Conventional generators are usually connected to the power network via a delta/wye zero connected step-up transformer. The main purpose of this transformer is to increase the voltage from generator level, typically in the range 10–25 kV, to the voltage of the power network which can be several hundred kV. The delta winding of the transformer, which is connected to the generator, has the feature, as noted above, that it blocks third harmonic currents.

When a machine is directly connected to the power network this third harmonic voltage, depending on the grounding of the generator, results in a third harmonic current in the power network. To reduce this third harmonic current it is possible to chose a high impedance generator grounding, grounding with a third harmonic filter or isolated neutral. When a direct grounding is required the third harmonic problem is not solved with the techniques described above. Furthermore, third harmonic filters and delta/wye-zero connected step-up transformer can be costly.

For a conventional synchronous machine and for balanced system conditions, the air gap flux rotates in the same direction and in synchronism with the field winding on the rotor. During unbalanced system conditions, negative sequence current is produced. There are a number of sources of unbalanced three phase currents to a machine. The most common causes are system asymmetries (e.g., untransposed transmission lines), unbalanced loads, unbalanced system faults, and open circuits (e.g., broken conductor). The negative sequence current component rotates in the opposite direction from the rotor. The flux produced by this current as seen by the rotor has a frequency of twice the synchronous speed as a result of the reverse rotation combined with the positive rotation of the rotor. The skin effect of the twice frequency rotor current causes it to be forced into the surface elements of the rotor. These rotor currents can cause dangerously high temperatures in a very short time. It is common practice to provide protection for the generator for external negative sequence currents. This protection consists of a time overcurrent relay which is responsive to negative sequence current and usually operates by tripping the generator breaker.

Referring to induction machines in general and to synchronous machines in particular. The rotor of a synchronous machine usually consists of electromagnets that under steady state conditions rotates with a speed that is proportional to the frequency of the current in its stator winding. The switch usually is a three phase winding.

If the rotor consists of electromagnets the field winding is usually feed with do power from either a static or a rotating exciter. By controlling the do current in the field winding, the magnetic flux in the machine can be controlled and thus can, e.g., the voltage at the stator terminals be controlled. Various control functions are commonly included in the exciter control system such that the machine behaves in a way acceptable for the system. Examples of such control functions are AVR (Automatic Voltage Regulator) and PSS (Power System Stabilizer).

The following is a brief description of various subsystems encountered in a typical excitation control system as shown in FIG. 2A.

1. Exciter. Provides the do power to the synchronous machine field winding, constituting the power stage of the excitation system.
2. Regulator. Processes and amplifies input control signals to a level and form appropriate for control of the exciter.
3. Terminal voltage transducer and load compensator. Senses stator terminal voltage, rectifies and filters it to do quantity and compares it with a reference which represents a desired terminal voltage. In addition, load (or line-drop, or reactive) compensation may be provided, if it is desired to hold constant voltage at some point electrically remote from the generator terminal.
4. Power System Stabilizer. Provides an additional input signal to the regulator to damp power system oscillations. Some commonly used input signals are rotor speed deviation, accelerating power, and frequency deviation.
5. Limiters and protective circuits. These include a wide array of control and protective functions which ensures that the capability limits of the exciter and the synchronous machine are not exceeded. Some of the commonly used functions are the field-current limiter, maximum excitation limiter, terminal voltage limiter, volts per-Hertz regulator and protection, and underexcitation limiter.
6. Synchronous machine. Opening with an electromagnetically exciter field.

The invention comprises an electric machine which employs a winding in the form of a cable, a stator, a rotor, at least one main winding and at least one auxiliary winding. The main winding is connected to the power network for producing and/or consuming active and/or reactive power.

SUMMARY OF THE INVENTION

With one, or more, auxiliary windings in the stator of the machine it is possible to influence the magnetic flux in the machine such that the above mentioned problems are solved. To achieve this influence an external electric circuit is connected to the auxiliary winding(s). The external electric circuit is designed such that a suitable current flows in the auxiliary winding(s), thus influencing the magnetic flux.

According to one implementation of the invention, the auxiliary winding(s) operate at a relatively low voltage. Accordingly, the external electric circuit comprises inexpensive low voltage equipment, as compared to equipment connected to the high voltage main winding.

A synchronous machine is typically designed such that the thermally based armature and field current limits cross each other at a point in the capability diagram corresponding to rated apparent power and rated power factor at rated voltage. The turbine is typically designed such that it can provide active power corresponding to rated apparent power at rated power factor, i.e. the armature and field current limits and the turbine maximum power limit cross each other in one point.

The auxiliary winding(s) can be used to decrease the need for a large field current and thus relieve the rotor of thermal stress. This can be accomplished by injecting reactive power into the auxiliary winding.

One way to implement this would be to employ a capacitor attached to the auxiliary winding via a breaker. If the breaker is closed, reactive power is produced by the capacitor and injected into the auxiliary winding and extracted from the main winding.

In such arrangement the terminal voltage of the main winding may be controlled by employing voltage regulator on the field winding. If the thermally based field current limit is reached, the capacitor on the auxiliary winding is switched in. The machine can then deliver the same amount of reactive power as with a conventional rotor design, but with a simpler rotor.

In order to achieve smoother control, the capacitor may be divided into several mechanically switched parallel units. Another way to achieve smother control would be to replace a mechanically switched capacitor with a thyristor switched capacitor (TSC), static var compensator (SVC). The amount of reactive power injected into the auxiliary winding can in this way be continuously controlled.

According to the Invention, by introducing an auxiliary winding in the stator, the magnetic flux in the machine can be controlled by controlling external equipment attached to such auxiliary winding. This means, for example, that the rotor circuit and attached control equipment in a synchronous machine can be greatly simplified.

The auxiliary winding may also be employed to provide auxiliary power. One implementation employs series connected AC/DC DC/AC converters with an energy store (e.g., batteries) connected to the DC bus bar or node. The converter may be used for controlling the voltage at the auxiliary voltage bus bar at all times and for delivering active power to the load connected to the auxiliary bus bar at rated frequency. In addition the converter closest to the auxiliary winding can be controlled such that it injects reactive power or extracts reactive power from the AC side into the auxiliary winding.

Other implementations include machines equipped with two auxiliary windings.

According to the aspects of the Invention hereinabove discussed, the design of the rotor can be simplified and made less expensive.

A characteristic feature of a power network tending towards voltage collapse is that synchronous generators in a region hit their respective limits for reactive power production, either by hitting the field current limit or the armature current limit, see e.g. Section 2.2.3 in CIGRE report "Criteria and Countermeasures for Voltage Collapse." In such an emergency situation the machines are usually allowed to exceed these limits for a period of time, depending on the time constants for heating of rotor and stator respectively. With a stator design according to the invention, the time constants for stator heating are large compared to the corresponding time constants for a conventional machine. This is mainly due to a insulation system of the Invention selected for the machines described herein. However, in order to take advantage of the larger stator time constants, it is important to make sure that the rotor does not overheat. With an auxiliary stator winding according to the invention, the auxiliary reactive power is obtained by injecting reactive power into the auxiliary stator winding not by increasing the field current. The auxiliary stator winding may have the same insulation system as the main winding and it may thus be designed to have similar time constants for heating. In this way the thermal problems associated with the rotot can be transferred to the more easily cooled stator, and the advantageous large time constants associated with stator can thus be fully utilized. A machine according to the invention can thus be overloaded for a longer period of time allowing the operators of the power network time to take action necessary to prevent voltage collapse. Another advantage of the invention is that the production of reactive power may be increased without exceeding the field heating limit.

The auxiliary winding can also be used to consume reactive power. An exemplary implementation may employ the inductive power of an R, L, C—circuit with breakers. Another preferred implementation could employ a converter operated such that it consumes reactive power. Yet another implementation could employ a SCV of TCR-type (thyristor controlled reactor).

During a transient disturbance following a power network fault and clearing of the fault by isolating the faulted element, the generator terminal voltage is low. For a conventional generator, the automatic voltage regulator responds to this condition by increasing the field voltage which has a beneficial effect on transient stability. The effectiveness of this type of control depends on the ability of the excitation system to quickly increase the field voltage to the highest possible value.

With a machine according to the invention, the high speed excitation system operating in the rotor circuit may be replaced by or combined with an electric circuit coupled to the auxiliary winding which quickly increases the voltage of the main winding. The electric circuit may include an SVC. The input signal may be the same as for a conventional high speed excitation system. However, the system working through the auxiliary winding has smaller time constants than the system working through the field or rotor. Further, the insulation system of the Invention employed in the auxiliary winding is capable of withstanding a high balanced fundamental frequency overvoltage, partly because it is dimensioned to withstand ground faults in the external circuit and partly because the insulation system is capable of withstanding high fundamental frequency overvoltages for several minutes. This allows for a high maximum in ceiling voltage. In other words, the system working through the auxiliary winding quickly affects the voltage of the main winding.

Dynamic braking uses the concept of applying an artificial electric load during a transient disturbance to increase the electrical power output of machines and thereby reduce rotor acceleration. One form of dynamic braking involves the switching in of shunt resistors for about 0.5 seconds following a fault to reduce the accelerating power of nearby machines and remove the kinetic energy gained during the fault. Bonneville Power Administration (BPA) has used such a scheme for enhancing transient stability for faults in the Pacific Northwest; the brake consists of a 1400 MW, 240 kV resistor.

With a machine according to the invention, active power may be extracted from the auxiliary winding in case of a disturbance in the power network connected to the main winding. Power extraction reduces the accelerating power and thus reduces the rotor acceleration. In one implementation a resistance is connected in shunt to the auxiliary winding via a breaker for a selected interval. With a breaker switched resistance, instability is avoided on the backswing by limiting the connection time. Other implementations are also possible, e.g. by utilizing a thyristor controlled resistor. In the exemplary arrangements of the invention the voltage level is typically lower, implying simpler equipment. Accordingly this equipment may be used to brake an individual machine not a large group of machines which may be the case if the brake is installed in the power network. According to an advantageous implementation of the invention, braking may be combined with fast voltage control described above because both have a beneficial effect on transient stability.

In another application braking may be used in machines that produce peak power, i.e., machines that start and stop often. An electrical brake is applied after the mechanical torque is removed by applying a short circuit to the terminals of the machine. The machine is magnetized such that rated current is achieved in the stator winding. This current creates copper losses which results in good braking effect, particularly at lower speeds. In accordance with the invention it is possible to implement an electrical brake by applying a short circuit to the main winding terminal. However, it is preferred to accomplish the short circuit at the lower voltage auxiliary winding terminals thereby avoiding the need for high voltage equipment. Other possible implementations involve extracting active power from the auxiliary winding by employing a braking resistor or loading an energy store.

If the machine is equipped with an auxiliary winding according to the invention, the conventional PSS, which operates through the field winding, may be combined with or replaced by a PSS operating through the auxiliary winding. In such arrangement a converter is controlled so that power is injected into or extracted from the auxiliary winding. As a result, power oscillation, seen as an oscillation in air gap torque, is reduced or eliminated, thus damping the system oscillation. A PSS operating through the auxiliary winding will provide a more or less pure damping for a broad frequency range because the gain and phase is less frequency dependent between the auxiliary winding and the electric torque as compared to between the field winding and the air gap torque.

When a machine is connected to a power network without step up transformer both the power network and the machine, due to the rotating magnetic flux, will give a contribution to the fault current in the machine in case of an internal ground fault.

If an internal ground fault occurs in the machine it can result in a high fault current which may damage the machine. The damage of the machine depends on the magnitude and the duration of the fault current. To reduce the damage in the machine it is desirable to reduce both the magnitude and the duration of the fault current.

In a conventional generator plant this is achieved by disconnecting the machine from the power network as fast as possible and by controlling the field current such that it decreases as fast as possible in order to remove the rotating magnetic flux in the machine. The effectiveness of this type of reduction of the rotating magnetic flux depends on the ability of the excitation system to quickly decrease the field current. A high-initial response excitation and high-ceiling voltages are most effective in this regard due to the relatively high time constant for the field winding. Ceiling voltages are, however, limited by generator rotor insulation considerations.

With a machine according to the invention with an auxiliary winding in the stator it is possible to reduce or cancel the rotating magnetic flux in a machine and thus reduce the contribution of the fault current faster than in a conventional way. This is due to the relatively low time constant for the auxiliary winding. The reduction can be accomplished by injecting a current in the auxiliary winding which is controlled in such a way that it produces a rotating magnetic flux in the machine that will superimpose on the rotating magnetic flux produced by the field winding in the rotor such that the resulting magnetic flux is decreased faster than in a conventional system.

The invention can for instance be realized by connecting the auxiliary winding to a frequency converter that can generate a controllable current in the auxiliary winding. If an internal ground fault occurs in the machine, the machine is disconnected from the power network with a breaker. Furthermore, the frequency converter injects a current in the auxiliary winding such that a rotating magnetic flux is produced that will superimpose on the rotating magnetic flux produced by the field winding in the rotor such that the resulting magnetic flux is decreased faster than in a conventional system.

The frequency converter may be controlled by measurement equipment via 20 control signals. The measurement equipment may measure the rotor angle with a rotor angle measurement signal and signals from the field winding.

When calculating and designing three-phase alternating current machines, the aim is normally to achieve as symmetrical and sinusoidal quantities as possible. In order to obtain an economic yield from the electromagnetic circuit in common types current machines, harmonic electromotive forces are generated as harmonics to the fundamental electromotive force. These harmonic electromotive forces may under certain conditions cause harmonic currents to flow in the current machine and in the power network.

When a machine is directly connected to a power network the third harmonic voltage results in a third harmonic current (depends on the grounding of the generator) in the power network. To reduce this third harmonic current it is possible to chose a high impedance generator grounding, grounding with a third harmonic filter or isolated neutral. When a direct grounding is required the third harmonic problem is solved with the techniques described above.

With a machine according to the invention with an auxiliary winding in the stator it is possible to reduce or cancel the harmonics generated in the machine. This can be accomplished by injecting a current in the auxiliary winding which is controlled in such a way that it produces a magnetic flux in the machine that will superimpose on the generated harmonic magnetic flux produced by the machine such that the resulting harmonic magnetic flux is reduced or canceled. This will reduce or cancel the contribution of harmonics from the machine.

The invention can for instance be realized by connecting the auxiliary winding to a frequency converter that can generate a controllable magnetic flux in the 20 machine. The frequency converter is controlled in such a way that the auxiliary winding generates a magnetic flux which superimpose on the generated harmonic magnetic flux produced by the machine such that the resulting harmonic magnetic flux is reduced or canceled. This will reduce or cancel the contribution of harmonics from the machine.

According to the invention, it is possible to run a machine equipped with an auxiliary winding which is exposed to external negative sequence currents. This can be accomplished by injecting a negative sequence current in the auxiliary winding for producing a negative sequence air gap flux component such that the negative sequence air gap flux component due to the negative sequence current in the main winding is canceled or reduced to the extent that dangerous rotor heating is avoided.

According to this invention, as a consequence of an auxiliary winding in the stator it is possible to move the cooling problem from the hard-to-cool rotor to the more easily cooled stator.

With this invention, the overload capacity is enhanced due to a choice of insulation system of the main winding and the auxiliary winding.

According to the invention, the auxiliary winding in the stator allows a faster control of the magnetic flux in the machine than known methods which results in higher initial response performance. This is due in part to the fact that the time constant for a winding stator is much lower than for winding in the rotor. With this invention it is possible to brake rotor accelerations with, to the auxiliary winding, e.g., breaker connected relatively low voltage resistors.

According to the invention, with an auxiliary winding in the stator, it is possible to implement a PSS with more or less pure damping one of a broad frequency range.

According to the invention, with an auxiliary winding, it is possible to faster reduce the contribution of an internal fault current.

With this invention this extra winding can reduce the third harmonics in the generated electromotive force by superimposing an opposite third harmonic magnetic flux to the main magnetic flux. With this winding other harmonics also can be reduced in the same way.

In an alternative embodiment, the cable which is used as a winding may be a conventional power cable. The earthing of the outer semiconducting layer 11 then takes place by stripping the metal shield and the sheath of we cable at suitable locations.

The scope of the invention accommodates a large number of alternative embodiments, depending on the available cable dimensions as far as insulation and the outer semiconductor layer are concerned. Also embodiments with so-called cycle chain slots can be modified in excess of what has been described here.

As mentioned above, the magnetizing circuit may be located in the stator and/or the rotor of the rotating electric machine. However, the design of the magnetizing circuit will largely correspond to the above description independently of whether the magnetizing circuit is located in the stator and/or the rotor.

As winding, a winding is preferably used which may be described as a multilayer, concentric cable winding. Such a winding implies that the number of crossings at the end windings has been minimized by placing all the coils within the same group radially outside one another. This also permits a simpler method for the manufacture and the threading of the stator winding in the different slots.

The invention is generally applicable to rotating electric machines for voltages exceeding 10 kV and as high as 800 kV or higher. Rotating electric machines according to what is described herein are examples of rotating electric machines for which the invention is applicable.

Small harmonics can be induced in the machine to be used for relay protection to detect faults. For instance 100% stator protection against ground faults.

The main voltage may be measured with an auxiliary winding.

It is now possible to have more than one auxiliary winding in the stator.

The magnetic flux in a machine can be controlled via an auxiliary winding for most types of machines, e.g., induction machines. The challenge is to achieve this for machines where the control of the magnetic flux traditionally is achieved through the field circuit in the rotor to the extent that the field control can be replaced by a control system working through the auxiliary winding. The description herein therefore emphasizes synchronous machines. However, the invention is not so limited and is applicable to other types of induction machines.

This invention provides additional means for controlling the magnetic flux in the machine as compared to the conventional exciter control in a conventional machine. This is achieved by connecting an outer electric circuit to the auxiliary winding(s) in the stator. The outer electric circuit is controlled such that a suitable current flows in the auxiliary winding(s), thus influencing the magnetic flux. It is in this way possible to either replace all relevant control functions typically found in a conventional control system working through the field winding or to combine and coordinate the control actions of the conventional exciter and the outer electric circuit according to the invention. Furthermore, it is possible to add some control functions which are not possible to implement when working through a field winding. Such functions can be dynamic breaking to reduce rotor acceleration, controlling the magnetic flux in order to reduce the fault current and reduce the generated harmonics in the machine.

BRIEF DESCRIPTION OF THE DRAWINGS

FIG. 1 is a plot of the synchronous generator field and armature heating limits, FIG. 2 is a schematic illustration of the field and winding arrangement of a salient pole machine having a field winding;

FIG. 2A is a functional block diagram of a synchronous machine excitation control system;

BRIEF DESCRIPTION OF THE INVENTION

In order to manufacture a machine having a magnetic circuit in accordance with the invention, a winding for the machine may be in the form of a flexible cable formed with a conductive core, a solid electrical insulation surrounding the core and one or more semiconducting layers surrounding the conductor and at the insulation. The resulting cable thus comprises a magnetically permeable, electric field confining, insulating winding for a high voltage machine.

Such cables are available as standard cables for transmission lines and other power engineering fields of use. Initially a short description of a standard cable will be given in which an embodiment is described. The inner current-carrying conductor comprises a number of non-insulated strands. Around the strands there is a semiconducting inner casing. Around this semiconducting inner casing, there is an insulating layer of extruded insulation. An example of such an extruded insulation is XLPE or, alternatively, rubber such as silicone rubber, thermoplastic resins or crosslinked thermoplastic resins. This insulating layer is surrounded by an outer semiconducting layer which, in turn, is surrounded by a metal shield and a sheath. Such a cable will be referred to below as a power cable.

Figure 3A:
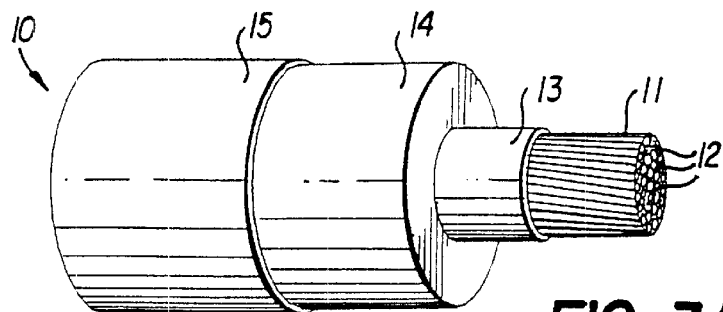
FIG. 3A is an illustration of a cable structure employed as a winding according to the invention.

A cable 10 intended as a winding in a rotating electric machine according to the invention is shown in FIG. 3A. The cable 10 comprises a current-carrying conductor 11 which in an exemplary embodiment includes both non-insulated and insulated strands 12. Electromechanically transposed, extruded insulated strands are also possible. Around the conductor 11 there is an inner semiconducting layer 13 which, in turn, is surrounded by a solid insulation layer 14. This part is surrounded by an outer semiconducting layer 15. The cable used as a winding in the exemplary embodiment has no metal shield and no external sheath. To avoid induced currents 20 and losses associated therewith, the outer semiconductor may be cut off, preferably in the end winding, that is, in the transitions from the sheet stack to the end windings. Each cut-off part is then connected to ground, whereby the outer semiconductor will be maintained at, or near, earth potential along the entire cable length. This means that, around the extruded insulated winding at the end windings, the contactable surfaces, and the surfaces which are dirty after some time of use, only have negligible potentials to earth, and they also cause negligible electric fields.

Figure 3B:
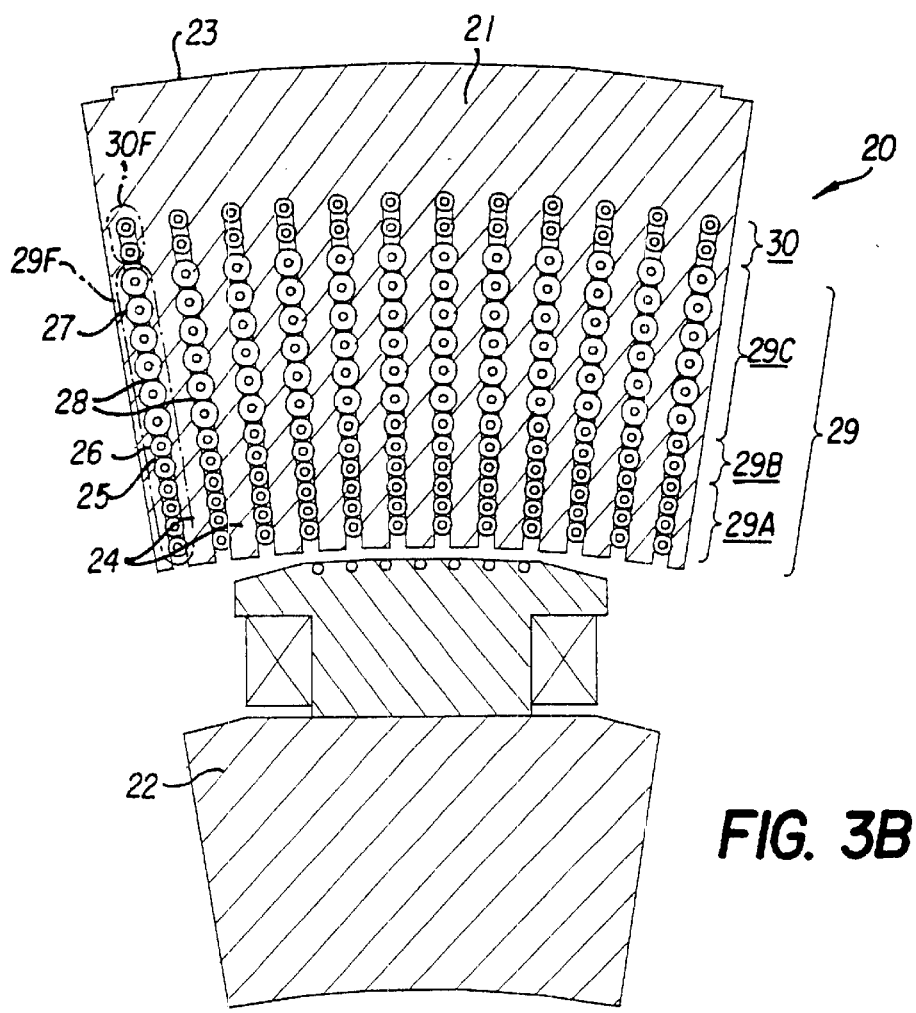
FIG. 3B is a schematic illustration of a part of a synchronous generator employing an auxiliary coil in accordance with the present invention.

FIG. 3B illustrates a part of rotating electric machine 20. The design of the magnetic circuit as regards the slots and the teeth, respectively, are important. The slots should connect as closely as possible to the casing of the coil sides. It is also desirable that the teeth at each radial level are as wide as possible. This is important to minimize the losses, and the magnetization requirement of the machine.

It should be understood that the machines described herein may be single or multi-phase machines. Such machines may have zigzag, delta, or Y-connected windings in accordance with known techniques. Such windings may thereafter be connected to control circuits described hereinafter.

With the cable 10 described above, there are many possibilities of being able to optimize the magnetic core. For example, a magnetic circuit in the stator of a rotating electric machine 20 is referred to. FIG. 3B. The embodiment shows an axial 15 end view of a sector/pole pitch 21 of the machine 20 according to the invention. The rotor with the rotor pole is designated 22. In conventional manner, the stator is composed of a laminated core of electric sheets successively composed of sector shaped sheets. From a yoke portion 23 of the core, located at the radially outermost end, a number of teeth 24 extend radially inwards towards the rotor. Between the 20 teeth there are a corresponding number of slots 25. The use of cables 26 of the type as described above permits the depth of the slots for high-voltage machines to be made larger than what is possible according to the state of the art. The slots 25 have a cross section tapering towards the rotor 22 since the need for cable insulation becomes less with for each winding layer towards the air gap, assuming that the low part of the winding is placed closest to the air gap. As is clear from the figure, the slot comprises a circular cross section 27 around each layer of the winding with narrower waist portions 28 between the layers. Such a slot cross section may be referred to as a so-called cycle chain slot. In the embodiment shown in FIG. 3B, the machine has a main winding 29 and an auxiliary winding 30. The windings are formed of interconnected cables with different dimensions depending on the cable insulation used. For example, the machine winding 29 is arranged in correspondingly dimensioned main winding sections 29A, 2913, 29C. The auxiliary winding 30 is shown as having a single dimension although if desired, multiple dimension cable 10 may be utilized. In the embodiment shown a modified cycle chain slot is employed. FIG. 3B also shows that the stator tooth can be shaped with a practically constant radial width along the depth of the slot.

In the exemplary embodiment the windings 29A, 2913, 29C may be a single main winding 29 or separate voltage level windings designated as A, B and C. The auxiliary winding 30 may be a flux control winding according to the invention. In addition, the auxiliary winding 30 may be used for auxiliary power generation if desired. The auxiliary windings 30 may be a low voltage winding allowing for the use of supplemental equipment. It should be understood that other winding arrangements may be used for flux control.

Figure 4:
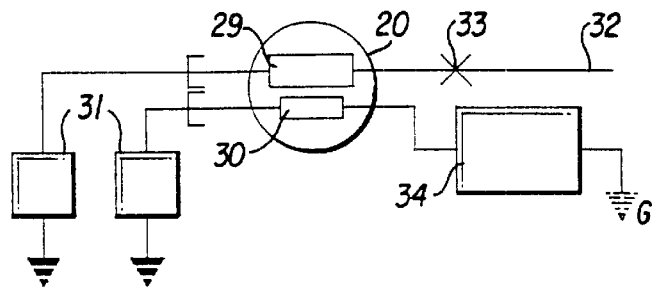
FIGS. 4 to 17 are schematic block diagrams illustrating various control arrangements for a synchronous machine having an auxiliary winding in accordance with the present invention.

FIG. 4 illustrates an exemplary high voltage generator 20 according to the invention having a main winding 29 and an auxiliary winding 30. The main winding 29 is coupled between a ground G and ground equipment 31 and a high voltage line 32 via a breaker 33. The line 32 may be a high voltage network or transmission line. The auxiliary winding 30 is coupled to a control network 34 which is capable of producing at least one of phase, amplitude and frequency variations in the magnetic flux in the machine via auxiliary winding 30.

Figure 3C:
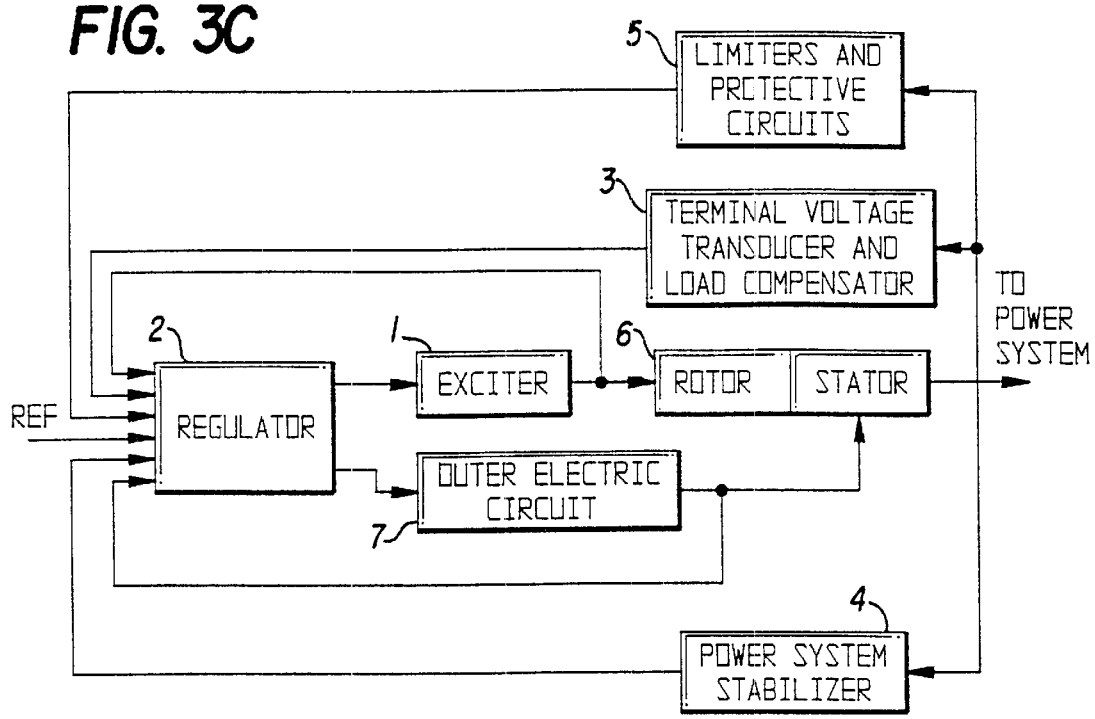
FIGS. 3C–3E are schematic single line diagrams illustrating exemplary embodiments of the invention.
Figure 3D:
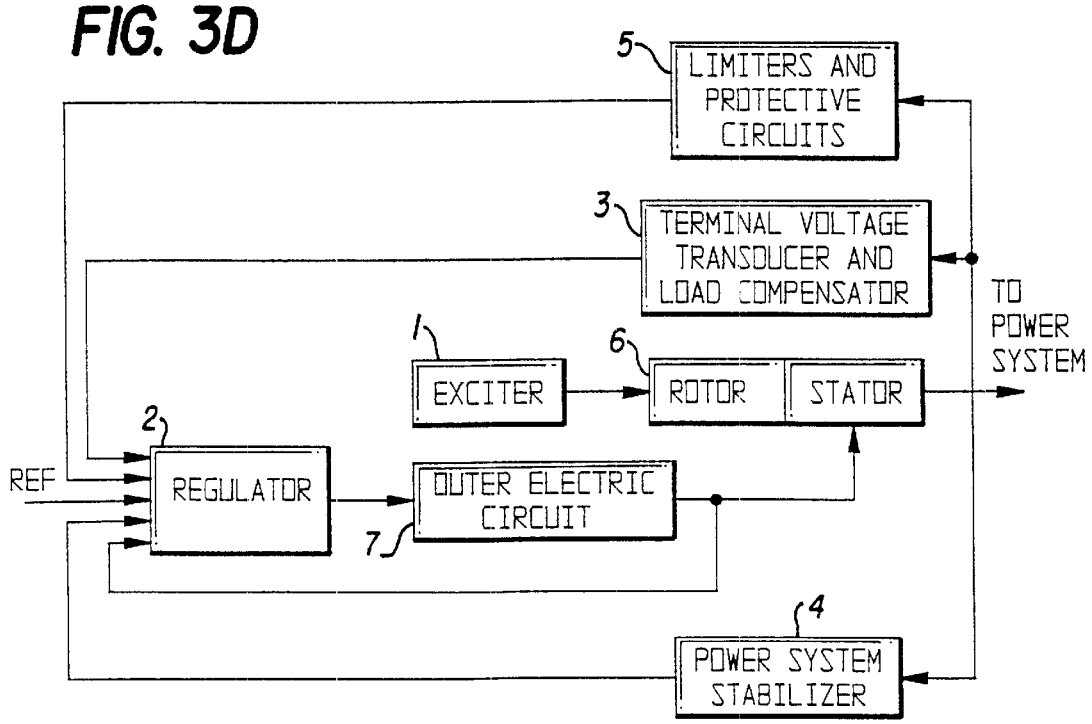
Figure 3E:
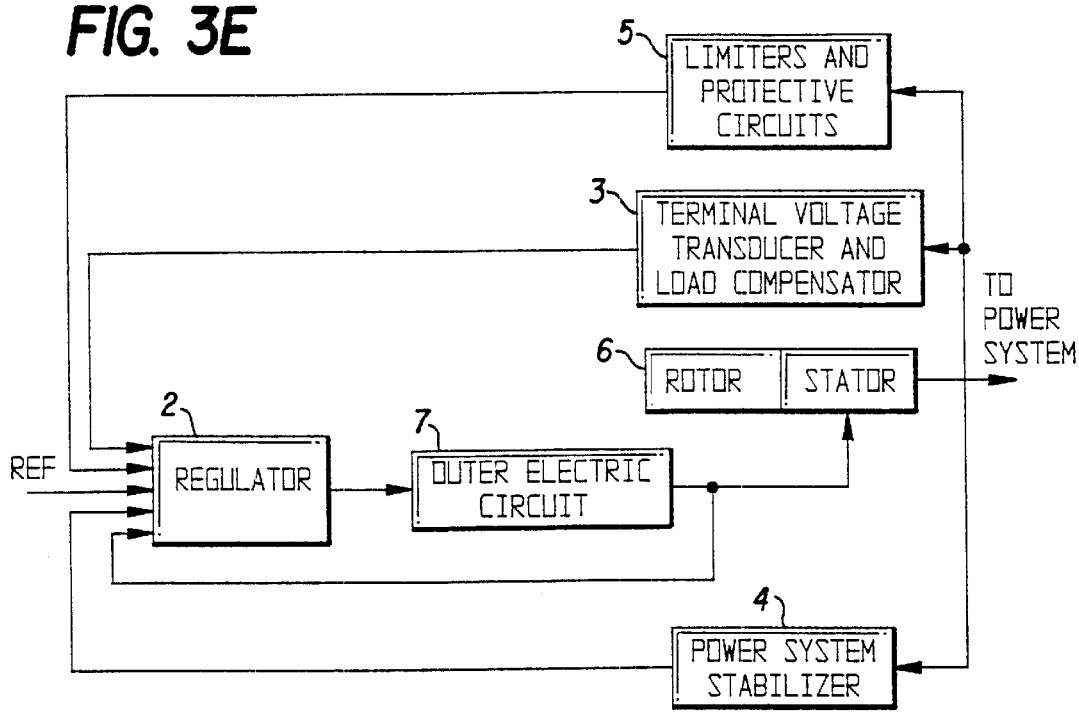

The following is a brief description of various subsystems as shown in FIGS. 3C–3E.
1. Exciter. Provides the do power to the synchronous machine field winding, constituting the power stage of the excitation system.
2. Regulator. Processes and amplifies input control signals to a level and form appropriate for control of the outer electric circuit (and exciter where appropriate).
3. Terminal voltage transducer and load compensator. Senses stator terminal voltage, rectifies and filters it to do quantity, and compares it with a reference which represents a desired terminal voltage. In addition, load (or line-drop, or reactive) compensation may be provided, if it is desired to hold constant voltage at some point electrically remote from the generator terminal.
4. Power System Stabilizer. Provides an additional input signal to the regulator to damp power system oscillations. Some commonly used input signals are rotor speed deviation, accelerating power, and frequency deviation.
5. Limiters and protective circuits. These include a wide array of control and protective functions which ensures that the capability limits of the exciter, the outer electric circuit and the synchronous machine are not exceeded. Some of the functions are the field-current limiter, maximum excitation limiter, main winding terminal voltage limiter, auxiliary winding terminal voltage limiter, stator main winding current limiter, stator auxiliary winding current limiter, volts-per-Heitz regulator and protection, and underexcitation limiter.
6. Synchronous machine according to the invention with at least one auxiliary winding.
7. Outer electric circuit. Controls the current in the auxiliary winding such that the required influence of the magnetic flux is achieved.

FIG. 3C shows an exemplary embodiment of the invention where the magnetic flux in the machine is controlled by the field winding in the rotor via the exciter (1) and by the auxiliary winding in the stator via the outer electric circuit (7). The exciter (1) and the outer electric circuit (7) is controlled by the regulator (2) in a coordinated fashion. With this invention the exciter (1) and the rotor can be simplified.

FIG. 3D shows an exemplary embodiment of the invention where the magnetic flux from the field winding is constant, since the exciter (1) provides the field winding with constant current. The control of the magnetic flux in the machine is achieved by the regulator via the outer electric circuit (7) connected to the auxiliary winding. With this invention the exciter (1) and the rotor can be simplified.

FIG. 3E shows an exemplary embodiment of the invention where the synchronous machine (6) is assumed to have a salient pole rotor. The field winding and the exciter can in this situation be removed. The saliency of the rotor implies that the rotor will be subjected to a reluctance torque. Without control action from the outer electric circuit (7), the machine would be underexcited. However, with control action from the outer electric circuit (7), the flux in the machine can be controlled via the regulator (2). The rotor is in this case obviously greatly simplified.

As mentioned above, if the air gap flux is controlled from an auxiliary winding in the stator in a synchronous machine, other control objectives can be achieved than if the air gap flux only is controlled from the rotor. This is, for instance, the case if the auxiliary winding is a three-phase winding which can be controlled in an unsymmetrical way.

In FIG. 4 the external circuit may comprise a passive, and if desirable, controllable R, L,C—circuit 34 including one or more passive elements such as resistors, capacitors and inductors connected in various arrangements such as zigzag, delta or wye. The R,L,C—circuit 34 may also comprise breakers, thyristors or other types of semiconductor power switches. A possible connection to ground is shown schematically.

In a circuit comprising a capacitor connected to the auxiliary winding 30 the machine 20 is able to produce extra reactive power and give an extra contribution of reactive power to the high voltage power network 32. If the circuit 34 connected to the auxiliary winding 30 comprises a inductor the machine 20 is able to consume reactive power. If the circuit 34 connected to the auxiliary winding 30 comprises a resistor the machine 20 is able to consume active power, and will thus generate a braking/damping torque to the machine.

Figure 5:
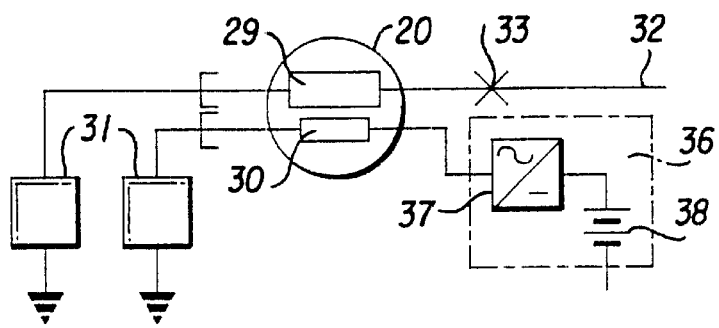

FIG. 5 shows another exemplary embodiment of the invention where the machine 20 is connected to high voltage power network 32 and the auxiliary winding 30 is connected to a four quadrant frequency converter 36. In the figure the frequency converter 36 includes an AC/DC converter 37 and a battery 38 as an energy store. Such an energy store can also be a capacitor or another component that can store energy. The AC/DC converter 37 may be a four quadrant pulse width modulated converter (PWM). Other types of converters are also possible.

With this invention it is possible to continuously and quickly affect the interchange of active and reactive power between the AC/DC converter 37 and the auxiliary winding 30. The AC/DC converter 37 can be made responsive to both balanced and unbalanced three-phase quantities.

Figure 6:
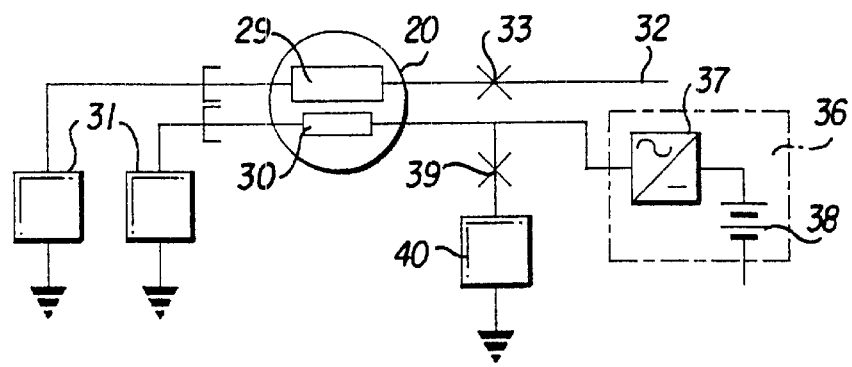

FIG. 6 shows another embodiment of the invention, similar to the configuration shown in FIG. 5 but with the addition of a breaker 39 connected to an R, L, C—circuit 40 which, in turn, is grounded.

With this embodiment of the invention it is possible to switch the passive R, L, C—circuit 40 to make slower discrete steps in the interchange of active and reactive power between the auxiliary winding 30 and said R, L, C—circuit 40 and to use an AC/DC converter 37 and an energy store 38 to make the faster continues interchange.

Figure 7:
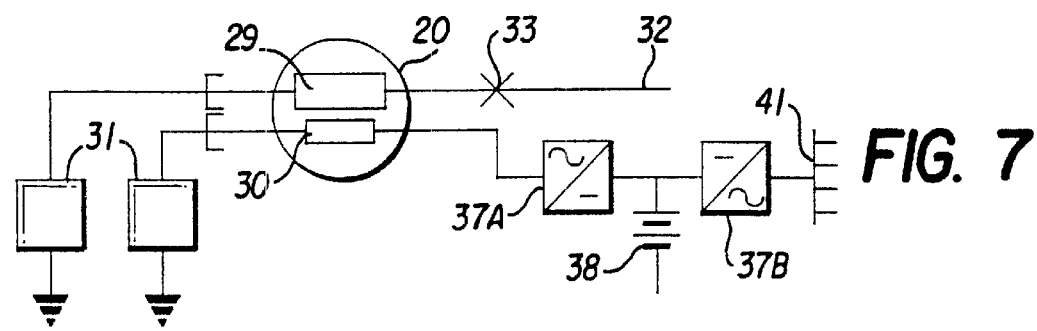

FIG. 7 shows another embodiment of the invention similar to the embodiment shown in FIG. 5 but wherein the auxiliary winding 30 is connected to an auxiliary power network 41 via an AC/DC converter 37A, an energy store 38 and a 15 DC/AC converter 37B. Both of the converters can be four quadrant converters, e.g. PWM converters.

With this embodiment of the invention it is also possible to use the auxiliary winding 30 to feed the auxiliary power network 41 with power at rated voltage and at a frequency within prescribed tolerances via the AC/DC converter 37A, the energy store 38 and the DC/AC converter 37B.

Figure 8:
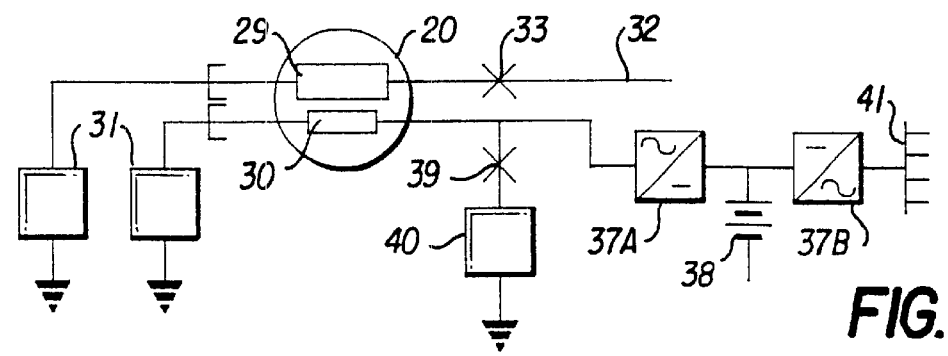

FIG. 8 shows another embodiment of the invention similar to the arrangements shown in FIGS. 6 and 7. With this embodiment of the invention a combination of the advantages shown in FIG. 6 and FIG. 7, already described, is achieved.

Figure 9:
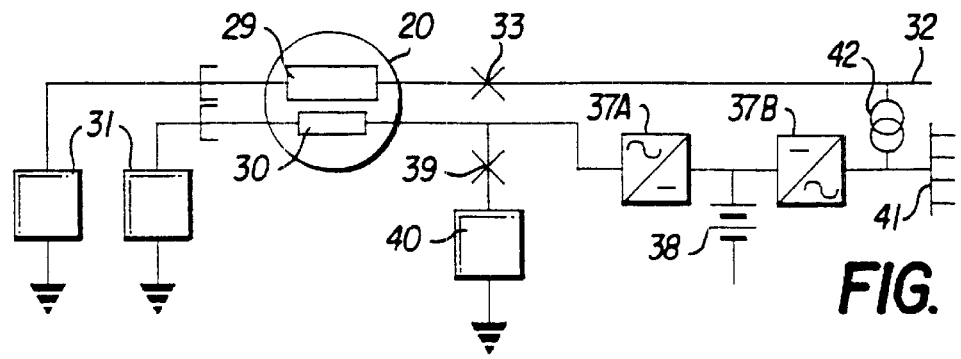

FIG. 9 shows another embodiment of the invention similar to the invention shown in FIG. 8, but wherein the auxiliary power bus bar 41 is connected to the high voltage power network 34 via a transformer 42. With this embodiment of the invention it is possible to continuously feed the energy storage 38 by the high voltage power network 41 via said transformer 42.

Figure 10:
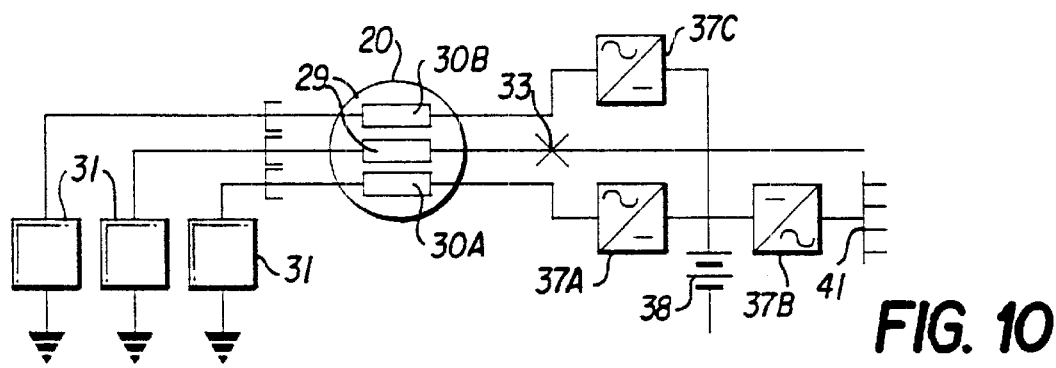

FIG. 10 shows another embodiment of the invention similar to the arrangement shown in FIG. 7 with the auxiliary windings 30A, 30B and an additional AC/DC converter 37C. In this embodiment of the invention, the control equipment may be simpler because each auxiliary winding 30A and 30B may be dedicated to separate tasks, e.g., controlling magnetic flux in the machine and providing auxiliary power.

Figure 11:
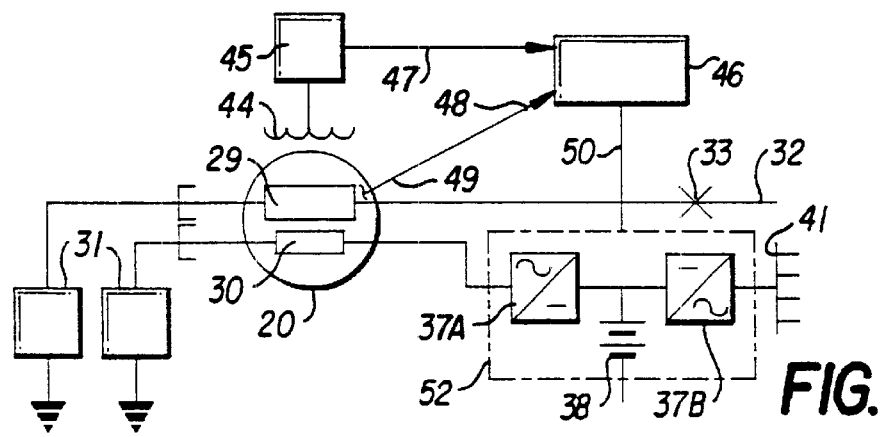

FIG. 11 shows another embodiment of the invention similar to the invention shown in FIG. 7 with the addition of measurement equipment 46. In the figure, the field winding 44 and field winding equipment 45 is also shown. A control signal 47 from the field winding equipment 45 and a control signal 48 from rotor angle measurement signal 49 supply measurement equipment 46 which, in turn, produces control signals 50 which control converter circuits 52. Other control signals can also be measured. With this embodiment of the invention it is possible to use the auxiliary winding 30 to reduce the fault current in the case of an internal fault.

Figure 12:
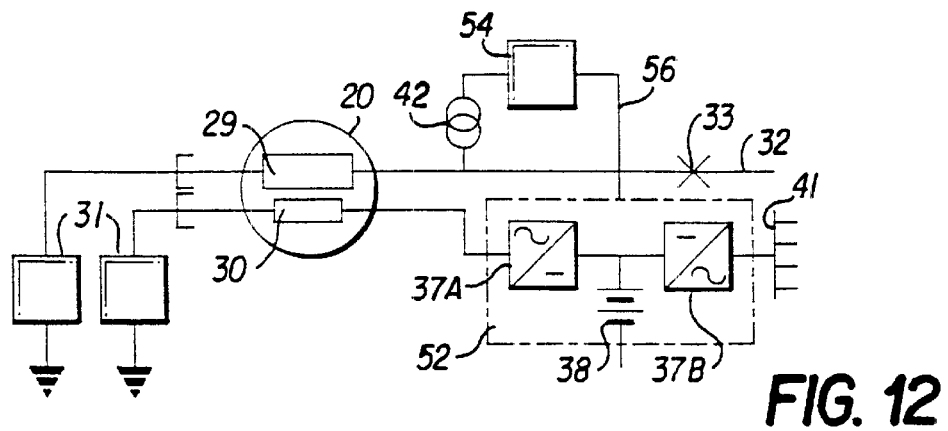

FIG. 12 shows another embodiment of the invention similar to the arrangement shown in FIG. 7 with the addition of a transformer 52 and measurement equipment 54. In this arrangement the measurement equipment 54 measures generated harmonics from the main winding 29 of the machine 20 via the transformer 54. Signals 56 from measurement equipment 54 control converter circuits 52 which operate as a frequency converter. Other control signals can also be measured. With this embodiment of the invention it is possible to use the auxiliary winding 30 to reduce the generated harmonics from the machine 20.

Figure 13:
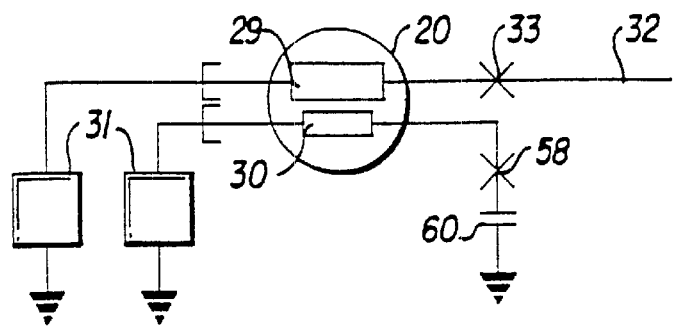

FIG. 13 shows another embodiment of the invention where the machine 20 is connected to a NO voltage power network 34 with a breaker 58 and series connected capacitor 60 connected in shunt from the auxiliary winding 30 to ground. With this embodiment of the invention it is possible to use the auxiliary winding 30 and the capacitor 58 to produce extra reactive power and give an extra contribution of reactive power to the high voltage power network 32 when the breaker 58 is closed.

Figure 14:
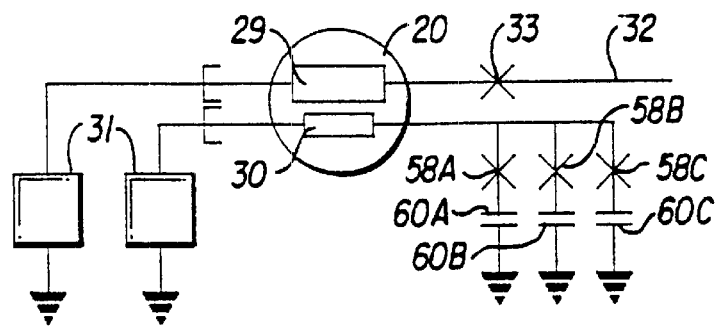

FIG. 14 shows another embodiment of the invention similar to the arrangement shown in FIG. 13 with the addition of a number of breakers 58A, 58B and 58C and connected capacitors 60A, 6013 and 60C. The multi-phase circuits comprise series connected breakers 58A, 5813, 58C and corresponding capacitors 60A, 60B and 60C, representing phases A, B and C. These circuits may be connected in Delta and Y configurations. With this embodiment of the invention, it is possible to use the auxiliary winding 30 and the capacitors 58A–58C to produce extra reactive power and to provide an extra contribution of reactive power to the high voltage power network 32. Due to the breakers 58A–58C the contribution of reactive power may be made in discrete steps.

Figure 15:
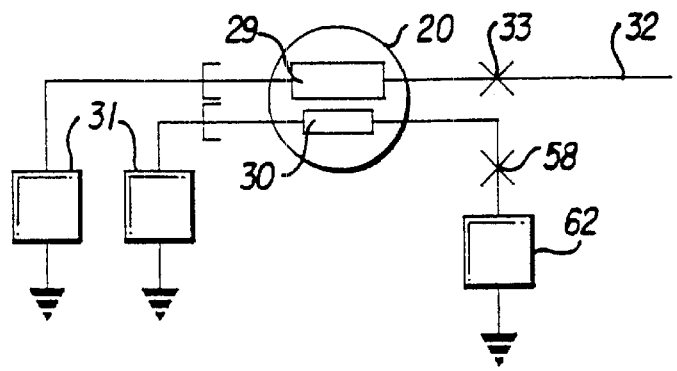

FIG. 15 shows another embodiment of where the auxiliary winding 30 is connected via a breaker 58 to a static var compensator (SVC) 62 of the TSC-type or TCR-type. In this embodiment of the invention it is possible to use the auxiliary winding 30 and the SVC 62 to produce extra or consume reactive power and thus contribute with extra capability of injecting and exchanging reactive power from the power network 32. The SVC 62 allows the change of this contribution of reactive power to be made continuously as compared than if breakers are used as a switching element.

Figure 16:
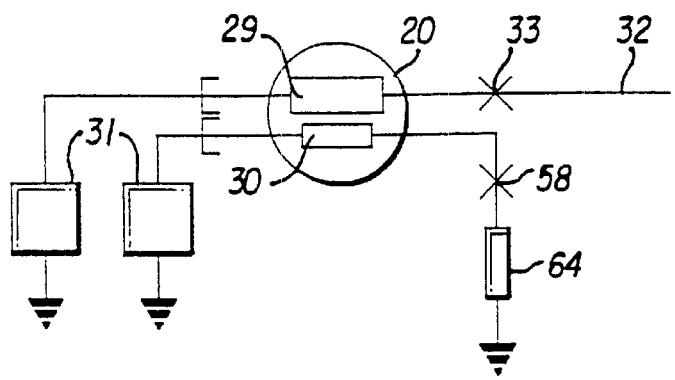

FIG. 16 shows another embodiment of the invention where the auxiliary winding 30 is serially connected to a breaker 58 and resistor 64. With this embodiment of the invention it is possible to use the auxiliary winding 30 and resistor 64 to electrically brake the machine 20 when the breaker 58 is closed.

Figure 17:
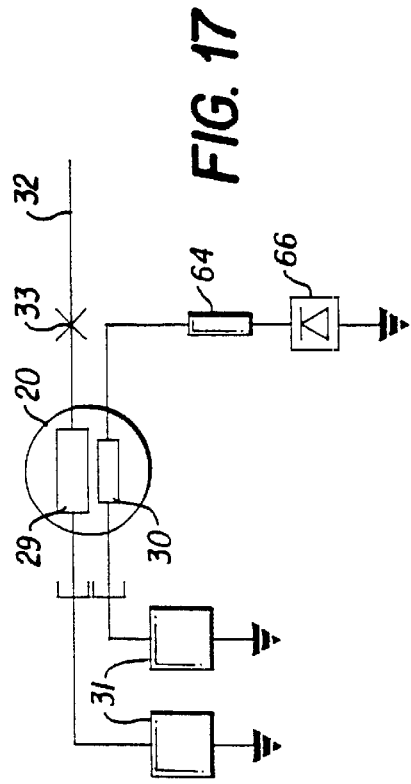

FIG. 17 shows another embodiment of the invention where the auxiliary winding 30 is connected to a thyristor 66 controlled resistor 64. With this embodiment of the invention it is possible to use the auxiliary winding 30 with the thyristor 66 controlled resistor 64 to electrically break the rotor speed.

Figure 18:
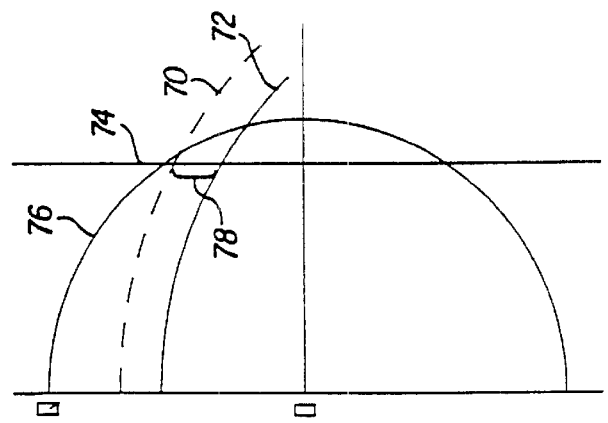
FIG. 18 is a plot of the synchronous generator field and armature heating limits showing improvements resulting from the present invention.

FIG. 18 illustrates a plot similar to FIG. 1 in which the field heating limit 70 according to a conventional rotor design (e.g., FIG. 1) may be improved (e.g., FIG. 18) to result in a new field heating limit 72 according to the invention. The vertical line 74 represents an exemplary turbine machine power limit as it relates to the armature heating limit 76. The reactive power difference between the respective conventional and new field heating limits 70 and 72, illustrated by the bracketed quantity 78, represents the reactive power injected via the auxiliary winding of the invention. It is possible to vary the active and reactive power injected and consumed by varying the flux as hereinabove described.

Figure 19:
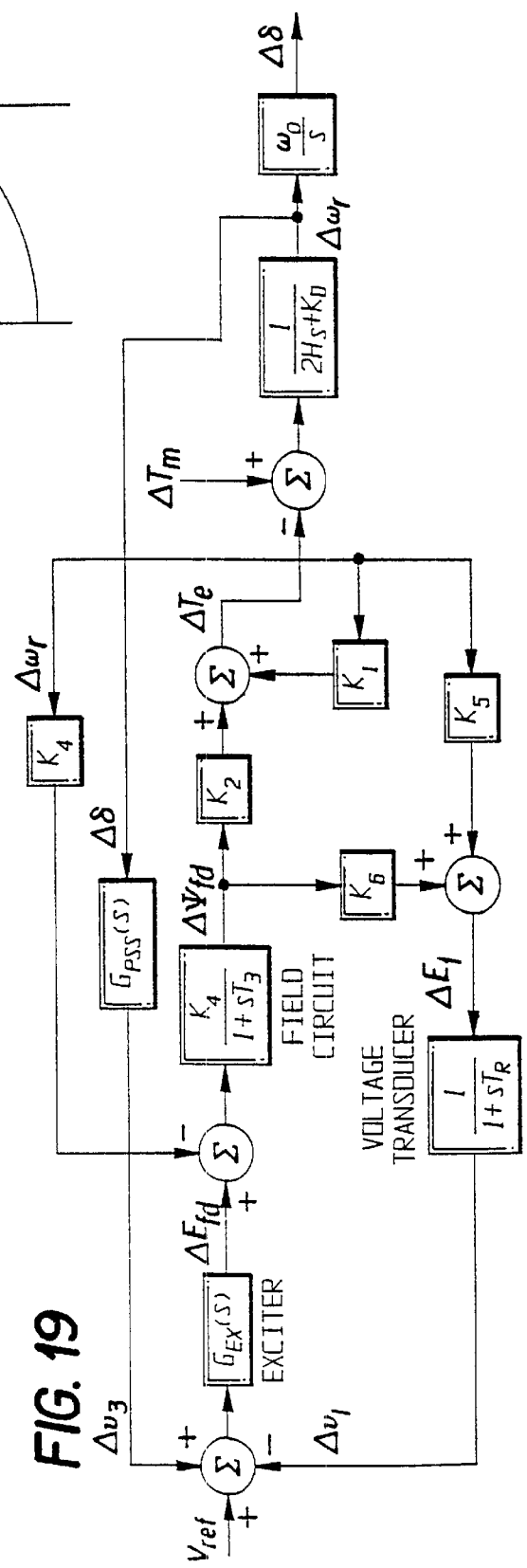
FIG. 19 is a schematic block diagram of a conventional motor control.

FIG. 19 shows a block diagram representation of a conventional control with an automatic voltage regulator (AVR) and power system stabilizer (PSS). The conventional system is complex, expensive and difficult to manage.

While there has been provided what are considered to be exemplary embodiments of the invention, it will be apparent to those skilled in the art that various changes may be made therein without departing from the invention. It is intended in the appended claims to cover such changes and modifications as fall within the true spirit and scope of the invention. magnetically permeable, field confining insulation system.

We claim:

1. A high voltage rotating electric machine comprising a stator, a rotor opposing said stator, and
   at least two windings, wherein at least one of said windings comprises a main winding in the stator for direct connection to a power network for at least one of producing and consuming power and at least one of the windings comprises an auxiliary winding in the stator for controlling the magnetic flux in the machine, and wherein at least one of said windings further comprises a cable including at least one current-carrying conductor and a magnetically permeable, electric field confining insulating cover surround the conductor comprising an inner layer having semiconducting properties in electrical contact with the conductor, a solid insulating layer surrounding and being in intimate contact with the inner layer and an outer layer having semiconducting properties surrounding and being in intimate contact with the insulation layer, said cable forming at least one uninterrupted turn in the corresponding winding of the machine.

2. The rotating electric machine according to claim 1, wherein the inner and outer layers form equipotential surfaces.

3. The rotating electric machine according to claim 2, wherein said inner and outer layers have substantially the same coefficient of thermal expansion as the insulating layer.

4. The rotating electric machine according to claim 1, wherein the inner and outer layers have corresponding contact surfaces and are secured to the adjacent insulating layer along the length of each corresponding contact surface.

5. The rotating electric machine according to claim 1, wherein the outer semiconducting layer is connected to a selected potential.

6. The rotating electric machine according to claim 5, wherein the selected potential is earth potential.

7. The rotating electric machine according to claim 1, wherein each winding is connectable to a separate potential.

8. The rotating electric machine according to claim 1, wherein the cable is flexible.

9. The rotating electric machine according to claim 1, wherein the current-carrying conductor comprises at least one of a plurality of insulated elements and at least one uninsulated element in electrical contact with the cover.

10. The rotating electric machine according to claim 1, wherein the cover has conductivity sufficient to establish an equipotential surface around the conductor.

11. The rotating electric machine according to claim 1, further comprising means coupled to the auxiliary winding for selectively adding and removing power at least one of active and reactive power from the machine.

12. The rotating electric machine according to claim 1, further comprising control means coupled to at least the auxiliary winding for controlling at least one of the phase, amplitude and frequency of the magnetic flux in the machine.

13. The rotating electric machine according to claim 1, further including at least one inverter/converter and a DC energy storage means coupled to the auxiliary winding.

14. The rotating electric machine according to claim 13, wherein the inverter/converter is a four quadrant converter/inverter.

15. The rotating electric machine according to claim 1, further including a transformer coupled between an output of the main winding and the auxiliary winding.

16. The rotating electric machine according to claim 1, including an RLC circuit coupled to the auxiliary winding.

17. The rotating electric machine according to claim 16, including at least one of three-phase resistor, inductances and capacitors in the RLC-circuit being connected in Y or delta.

18. The rotating electric machine according to claim 17, further including reactive means comprising at least one capacitor and a corresponding switch coupled to the auxiliary winding.

19. The rotating electric machine according to claim 16, wherein the RLC circuit includes switch means for selectively switching the RLC for controlling the magnetic flux in the machine.

20. The rotating electric machine according to claim 19, wherein the switch means comprises at least one of a breaker, a semiconductor power switch and a thyristor.

21. The rotating electric machine according to claim 1, further including a second auxiliary winding.

22. The rotating electric machine according to claim 21, further including at least one inverter for each auxiliary winding.

23. The rotating electric machine according to claim 1, further comprising a resistor switchable connected in at least one of shunt, delta and Y with the auxiliary winding.

24. The rotating electric machine according to claim 23, wherein the switch means comprises at least one of a breaker, a semiconductor switch and a thyristor.

25. The rotating electric machine according to claim 1, further comprising a field winding in operative relationship with the main winding and sensor means for sensing the condition of the field winding and means coupled to the auxiliary winding responsive to the condition of the field winding for injecting reactive power in said auxiliary winding.

26. The rotating electric machine according to claim 1, further comprising sensor means coupled to the main winding for producing an output and means coupled to the auxiliary winding responsive to the output for injecting or extracting power in the auxiliary winding.

27. The rotating electric machine according to claim 26, wherein the sensor means senses the main winding terminal voltage and the means coupled to the auxiliary winding is such that reactive power can be injected or extracted from the auxiliary winding such that the main winding terminal voltage is kept at a desired magnitude.

28. The rotating electric machine according to claim 26 wherein the sensor means senses power oscillations in the power network and the means coupled to the auxiliary winding is such that power can be injected or extracted from the auxiliary winding such that the oscillations in the air gap flux are reduced or eliminated.

29. The rotating electric machine according to claim 26, wherein the sensor means senses an internal fault in the machine and the means coupled to the auxiliary winding is such that reduction of the magnetic flux in the machine in order to reduce the fault current can be accomplished if appropriate.

30. The rotating electric machine according to claim 26, wherein the sensor means senses the harmonic content of the magnetic flux in the machine and the means coupled to the auxiliary winding is such that magnetic flux components can be produced via the auxiliary winding such that the resulting magnetic flux has a reduced or eliminated harmonic content.

31. The rotating electric machine according to claim 26, wherein the sensor means senses a disturbance in the power network and the means coupled to the auxiliary winding is such that dynamic braking to reduce rotor acceleration can be accomplished if appropriate.

32. The rotating electric machine according to claim 26, wherein the sensor means senses unbalanced phase currents in the main winding and the means coupled to the auxiliary winding is such that unbalanced currents can be injected in the auxiliary winding such that substantially only positive sequence magnetic flux remains in the machine.

33. The rotating electric machine according to claim 1, further comprising means controlling at least one of phase, amplitude and frequency of the flux of the machine.

34. The rotating electric machine according to claim 1, wherein at least one stator winding is a three-phase winding.

35. The rotating electric machine according to claim 1, including multiple phase windings and wherein each phase is individually controllable for compensating for unbalanced loading of the main winding.

36. The rotating electric machine according to claim 1, wherein the rotor comprises a field winding.

37. The rotating electric machine according to claim 36, further comprising means for controlling the field current to thereby control the flux of the machine.

38. The rotating electric machine according to claim 37, further comprising sensor means coupled to the main winding for producing an output and means coupled both to the auxiliary winding and the field winding responsive to the output for controlling the magnetic flux in the machine.

39. The rotating electric machine according to claim 1, wherein the rotor comprises a short circuited winding.

40. The rotating electric machine according to claim 1, wherein the auxiliary winding also produces auxiliary power.

41. A rotating electric machine according to claim 1, wherein the main winding comprises said cable.

42. The rotating electric machine according to claim 1, wherein the machine has a nominal field heating limit and the auxiliary winding is responsive to reactive power for varying the flux in the machine to increase the field heating limit above said nominal field heating limit.

43. The rotating electric machine according to claim 1, further including means in circuit with the auxiliary winding for selectively controlling power introduced therein.

44. The rotating electric machine according to claim 43, wherein said means includes at least one of a switch, an inverter/converter, and a frequency converter.

45. The rotating electric machine according to claim 44, further including a control capacitor in circuit with the switch.

46. The rotating electric machine according to claim 44, further including reactive elements in circuit with the switch.

47. A high voltage rotating electric machine comprising:
a stator;
a rotor opposing the stator mounted for rotation relative to each other;
a main winding for in the stator for connection to a power network; and
an auxiliary winding in the stator for controlling the magnetic flux in the machine, at least one of said windings comprising a cable including at least one current-carrying conductor comprising at least one insulated element and at least one uninsulated cover including and being in intimate contact with an outer semiconducting layer surrounding the conductor and being in intimate contact therewith; said cable forming at least one uninterrupted turn in the corresponding winding of the machine.

48. A high voltage rotating electric machine comprising:
a stator, and
a rotor opposing said stator mounted for rotation relative to each other;
a main winding in the stator for direct connection to a power network; and
an auxiliary winding in the stator for controlling the magnetic flux in the machine, at least one of said windings comprising a cable including at least one current-carrying conductor and a magnetically permeable, electric field confining insulating cover surrounding the conductor, said cable forming at least one uninterrupted turn in the corresponding winding of the machine, and wherein the cover includes an inner layer surrounding the conductor having semiconducting properties and being in electrical contact with said conductor, a solid insulating layer surrounding the inner layer and being in intimate contact with the inner layer, and an outermost layer surrounding the insulating layer having semiconducting properties and being in intimate contact with the insulating layer, said inner and outermost layers for producing a corresponding equipotential, field confining surface.

* * * * *